United States Patent [19]
Gschneidner, Jr. et al.

[11] Patent Number: 5,743,095
[45] Date of Patent: Apr. 28, 1998

[54] ACTIVE MAGNETIC REFRIGERANTS BASED ON GD-SI-GE MATERIAL AND REFRIGERATION APPARATUS AND PROCESS

[75] Inventors: Karl A. Gschneidner, Jr.; Vitalij K. Pecharsky, both of Ames, Iowa

[73] Assignee: Iowa State University Research Foundation, Inc., Ames, Iowa

[21] Appl. No.: 753,064

[22] Filed: Nov. 19, 1996

[51] Int. Cl.$^6$ ............................................. F25B 21/00
[52] U.S. Cl. .................... 62/3.1; 62/6; 505/889; 505/891; 148/301
[58] Field of Search ................... 62/3.1, 6; 505/889, 505/891; 148/301

[56] References Cited

U.S. PATENT DOCUMENTS

| | | | |
|---|---|---|---|
| 4,332,135 | 6/1982 | Barclay et al. | 62/3.1 |
| 4,408,463 | 10/1983 | Barclay | 62/3.1 |
| 4,459,811 | 7/1984 | Barclay et al. | 62/3.1 |
| 4,829,770 | 5/1989 | Hashimoto | 62/3.1 |
| 5,213,630 | 5/1993 | Hashimoto | 148/301 |
| 5,435,137 | 7/1995 | Gschneidner et al. | 62/3.1 |
| 5,462,610 | 10/1995 | Gschneidner et al. | 148/301 |

OTHER PUBLICATIONS

"Physical Properties of $Gd_5Si_4$", Sov. Phys. Solid State 22(7), Jul., 1980, pp. 1251–1252, Yu V. Serdyuk et al.

"New Ferromagnetic 5:4 Compounds in the Rare Earth Silicon and Germanium Systems", J. Phys. Chem. Solids, vol. 28, 1967, pp. 2283–2289, F. Holtzberg et al.

*Primary Examiner*—Christopher Kilner
*Attorney, Agent, or Firm*—Edward J. Timmer

[57] ABSTRACT

Active magnetic regenerator and method using $Gd_5(Si_xGe_{1-x})_4$, where x is equal to or less than 0.5, as a magnetic refrigerant that exhibits a reversible ferromagnetic/antiferromagnetic or ferromagnetic-II/ferromagnetic-I first order phase transition and extraordinary magneto-thermal properties, such as a giant magnetocaloric effect, that renders the refrigerant more efficient and useful than existing magnetic refrigerants for commercialization of magnetic regenerators. The reversible first order phase transition is tunable from approximately 30 K to approximately 290 K (near room temperature) and above by compositional adjustments. The active magnetic regenerator and method can function for refrigerating, air conditioning, and liquefying low temperature cryogens with significantly improved efficiency and operating temperature range from approximately 10 K to 300 K and above. Also an active magnetic regenerator and method using $Gd_5(Si_xGe_{1-x})_4$, where x is equal to or greater than 0.5, as a magnetic heater/refrigerant that exhibits a reversible ferromagnetic/paramagnetic second order phase transition with large magneto-thermal properties, such as a large magnetocaloric effect that permits the commercialization of a magnetic heat pump and/or refrigerant. This second order phase transition is tunable from approximately 280 K (near room temperature) to approximately 350 K by composition adjustments. The active magnetic regenerator and method can function for low level heating for climate control for buildings, homes and automobile, and chemical processing.

28 Claims, 22 Drawing Sheets

NON-ZERO MAGNETIC FIELD

ZERO MAGNETIC FIELD

ACTIVE MAGNETIC REFRIGERANTS BASED ON GD-SI-GE MATERIAL AND REFRIGERATION APPARATUS AND PROCESS

CONTRACTUAL ORIGIN OF INVENTION

The United States Government has rights in this invention pursuant to Contract No. W-7405-ENG-82 between the U.S. Department of Energy and Iowa State University, Ames, Iowa, which contract grants to the Iowa State University Research Foundation, Inc. the right to apply for this patent.

FIELD OF THE INVENTION

The present invention relates to magnetic refrigeration and, more particularly, to active magnetic refrigerants as well as magnetic regenerators and processes.

BACKGROUND OF THE INVENTION

Magnetic refrigeration is being considered as an alternative technique to gas compressor technology for cooling and heating based on engineering and economic considerations that indicate that active magnetic regenerator refrigerators, in principle, are more efficient than gas cycle refrigerators and thus can yield savings in the cost of operation and conservation of energy.

Magnetic refrigeration utilizes the ability of a magnetic field to affect the magnetic part of a solid material's entropy to reduce it and increase the temperature of the solid material. When the magnetic field is removed, the change or return of entropy of the magnetic solid material reduces the temperature of the material. Thus, magnetic refrigeration is effected by cyclic heat dissipation and heat absorption in the course of adiabatic magnetization and adiabatic demagnetization of the magnetic solid material via application/discontinuance of external magnetic fields. A refrigeration apparatus that exhausts or vents the released heat on one side of the apparatus when the magnetic solid material is magnetized and cools a useful load on another side when the magnetic solid material is demagnetized is known in the magnetic refrigeration art as an active magnetic regenerator magnetic refrigerator (also known by the acronym AMR/MR).

To-date, the only way to cool by magnetic refrigeration has been to utilize the magnetic entropy of a simple ferromagnet operating in the vicinity of its Curie temperature, this technique being analogous in principle to refrigeration utilizing the simple gas compression/expansion cycle. The major advantage of this type of magnetic refrigeration over the gas compression/expansion refrigeration is attributable to the ferromagnet refrigerant medium being a high density solid having a much higher volumetric heat capacity compared to the much lower density gas refrigerant medium. As a result, magnetic refrigerators using solid magnetic refrigerant material should be more effective and relatively easy to downsize without losing refrigeration capability.

Known prototype magnetic refrigerant materials used in active magnetic regenerator magnetic refrigerators have produced a temperature rise on application of magnetic field of approximately 2 K/Tesla where K is Kelvin degrees (i.e. approximately 2 degrees C./Tesla or approximately 3.6 degrees F./Tesla). These relatively small values of temperature rise require that high magnetic fields of the order of 6–7 Tesla be used in any practical refrigerator producing significant and economical acceptable cooling rates.

Since most of magnetic entropy changes occur near the magnetic ordering temperature (Curie temperature), the best performance of a ferromagnetic material is expected from 2–25 K below to 2–25 K above the transition temperature. For example, pure gadolinium (Gd) metal has been the best prototype active ferromagnetic refrigerant near room temperature (i.e. 293 K) in prototype magnetic refrigerators because its Curie temperature is 294 degrees K. However, gadolinium exhibits a second order ferromagnetic to paramagnetic transition upon temperature change from below to above the Curie temperature and as a result has only limited practical usefulness as an active magnetic refrigerator material.

An object of the present invention is to provide a magnetic refrigerant that exhibits by virtue of a reversible first order phase transition extraordinary magneto-thermal properties, such as a giant magnetocaloric effect, that renders the refrigerant more efficient and useful than existing magnetic refrigerants for commercialization of active magnetic regenerator refrigeration.

Another object of the present invention is to provide a magnetic refrigerant that exhibits such extraordinary magneto-thermal properties and also a remnant magnetization that reduces to zero when applied magnetic field falls to zero.

Another object of the present invention is to provide a magnetic refrigerant that exhibits extraordinary magneto-thermal properties by virtue of a reversible first order phase transition that is tunable from approximately 30 K to approximately 290 K (near room temperature) and above by compositional adjustments.

Still another object of the present invention is to provide a magnetic refrigerant that exhibits such extraordinary magneto-thermal properties and also a remnant magnetization that reduces to zero when applied magnetic field falls to zero.

Still a further object of the present invention is to provide active magnetic regenerator and method for refrigeration, air conditioning and heat pump uses exhibiting significantly improved efficiency and operating temperature range from approximately 30 K to 290 K and above.

Still an additional object of the present invention is to provide active magnetic regenerator and method using a superconducting magnet generated magnetic field, such as 1.5 Tesla and higher, or a relatively lower permanent magnet generated magnetic field, such as 0.5 to 1.5 Tesla.

SUMMARY OF THE INVENTION

The present invention provides an active magnetic regenerator and method that use a magnetic refrigerant represented in one embodiment by $Gd_5(Si_xGe_{1-x})_4$, where x varies from about 0.55 to zero, and that exhibits extraordinary magneto-thermal properties, such as a heretofore undiscovered giant magnetocaloric effect (giant magnetic entropy change) based on a reversible first order phase transition upon heating described below, providing a sharp reduction in magnetization near the magnetic ordering temperature (Curie temperature). For example, the refrigerant exhibits a magnetic entropy change that is at least twice that exhibited by polycrystalline Gd, which to-date is the best prototype active ferromagnetic refrigerant near room temperature (i.e. 293 K) in prototype magnetic refrigerators because its Curie temperature is 294 degrees K.

The refrigerant of the present invention also exhibits a remnant magnetization that reduces to zero when applied magnetic field falls to zero. In addition, the regenerator efficiency parameter (figure of merit) for the magnetic refrigerants of the present invention is 24% to 115% better than those of the best known to-date prototype refrigerants.

The reversible first order phase transition is tunable from approximately 30 K to approximately 290 K (near room temperature) and above by compositional adjustments, such as by adjusting the ratio of Si/Ge and/or by inclusion of alloying elements to this same end. A particular $Gd_5(Si_xGe_{1-x})_4$ refrigerant of the invention exhibits a heretofore unknown monoclinic crystal structure when x is from about 0.2 to about 0.5. The aforementioned magneto-thermal properties render the refrigerant of the invention significantly more efficient and useful than existing magnetic refrigerants for commercialization of magnetic regenerators and methods. The present invention provides an active magnetic regenerator and method for refrigerating, air conditioning and heat pump uses exhibiting significantly improved efficiency and operating temperature range from approximately 30 K to 290 K and above. The magnetic regenerator and method can use a magnetic field provided, for example, by a superconducting magnet to provide an alternating magnetic field, such as 1.5 Tesla and higher, or a permanent magnet magnetic field, such as 0.5 to 1.5 Tesla.

The active magnetic regenerator and method of the present invention can function as a refrigerator, air conditioner, and heat pump with significantly improved efficiency and operating temperature range from approximately 30 K to 290 K and above. Use in vehicles, such as automobiles, large buildings, homes, supermarket chillers, frozen food processing plants, refrigeration of food products, liquefaction of gases (such as hydrogen, natural gas, propane, ammonia, butane, etc.), chemical industry (for the manufacture of Cl, ethylene, polyethylene, etc.), and waste treatment (e.g. chemical, nuclear, agriculture. etc.) is contemplated.

The aforementioned objects and advantages of the present invention will become more readily apparent from the following detailed description taken with the following drawings.

DESCRIPTION OF THE DRAWINGS

In FIG. 2B, the temperature versus isothermal magnetic entropy change for $DyAl_2$, a prototype magnetic refrigerant, for a field change from 0 to 5 Tesla is shown for comparison purposes.

In FIG. 3B, the temperature versus isothermal magnetic entropy change for $GdAl_2$, a prototype magnetic refrigerant, for a field change from 0 to 5 Tesla is shown for comparison purposes.

In FIG. 4B, the temperature versus isothermal magnetic entropy change for pure Gd, a prototype magnetic refrigerant, for a field change from 0 to 5 Tesla is shown for comparison purposes.

The results shown in FIGS. 2, 3 and 4 are typical for all compositions of the $Gd_5(Si_xGe_{1-x})$ system for x between zero and 0.5.

Figure 5:
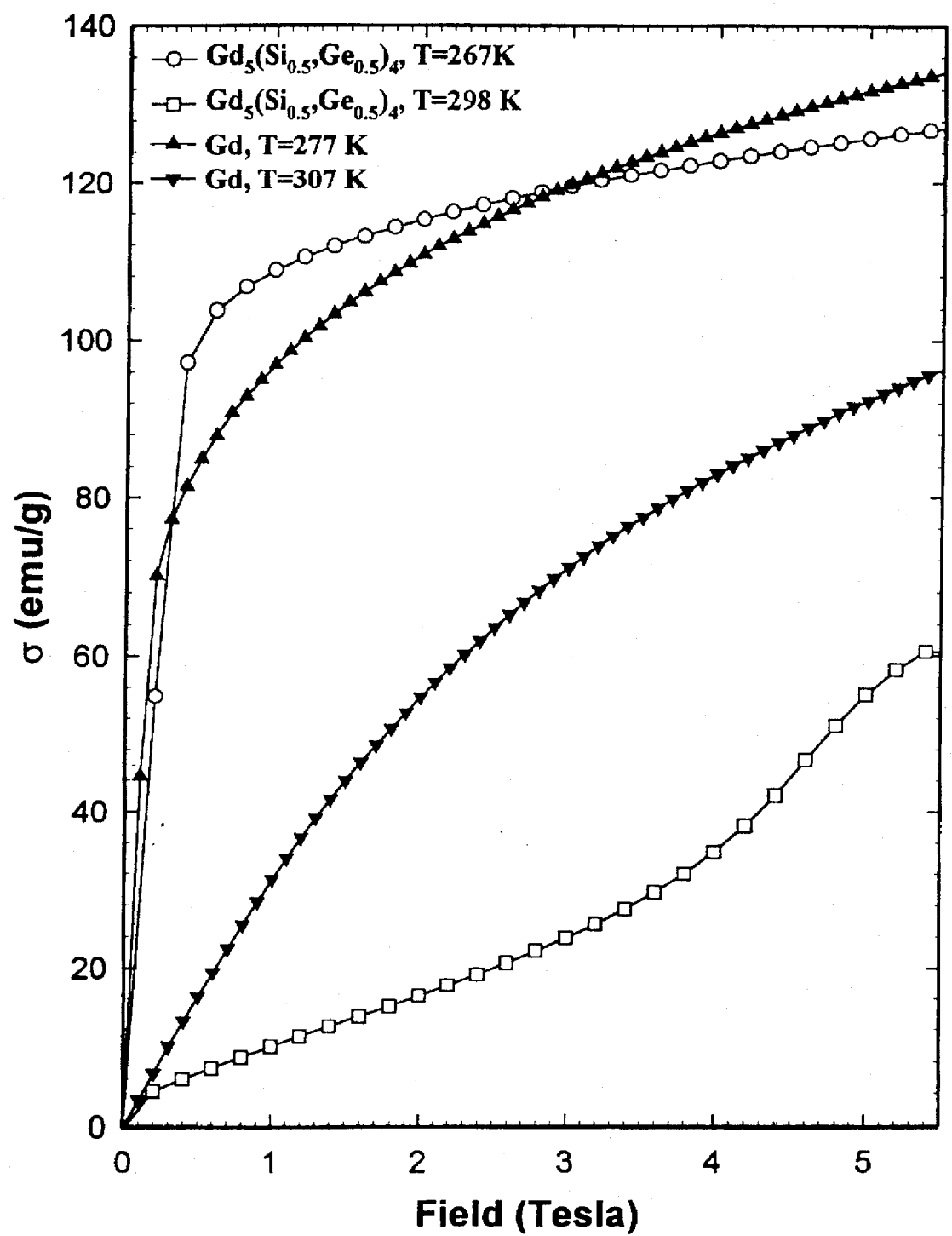

FIG. 5 is a graph of magnetic field versus magnetization isotherms for the $Gd_5(Si_xGe_{1-x})_4$ where x=0.5 and for Gd in the vicinity of their magnetic phase transitions 270 K and 294 K, respectively. The two isotherms for each refrigerant are approximately 30 K apart. The upper temperature isotherm represents the material's magnetization below the Curie temperature, and the lower temperature isotherm shows the magnetization above the transition.

Figure 6A:
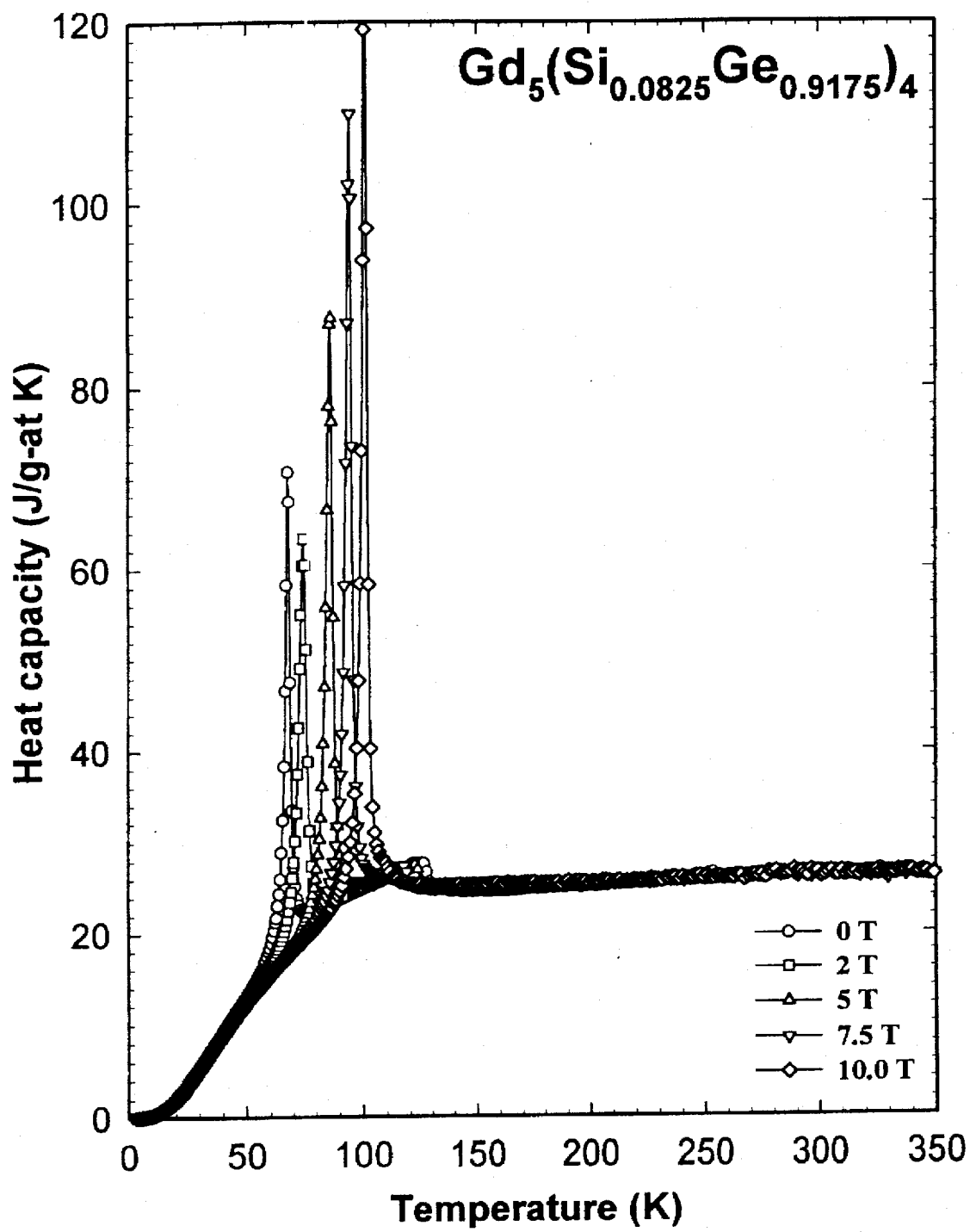

FIG. 6A is a graph of temperature versus heat capacity of $Gd_5(Si_{0.0825}Ge_{0.9175})_4$ in magnetic fields of 0, 2, 5, 7.5, and 10 Tesla from 0 to 350 K where K is Kelvin degrees.

Figure 6B:
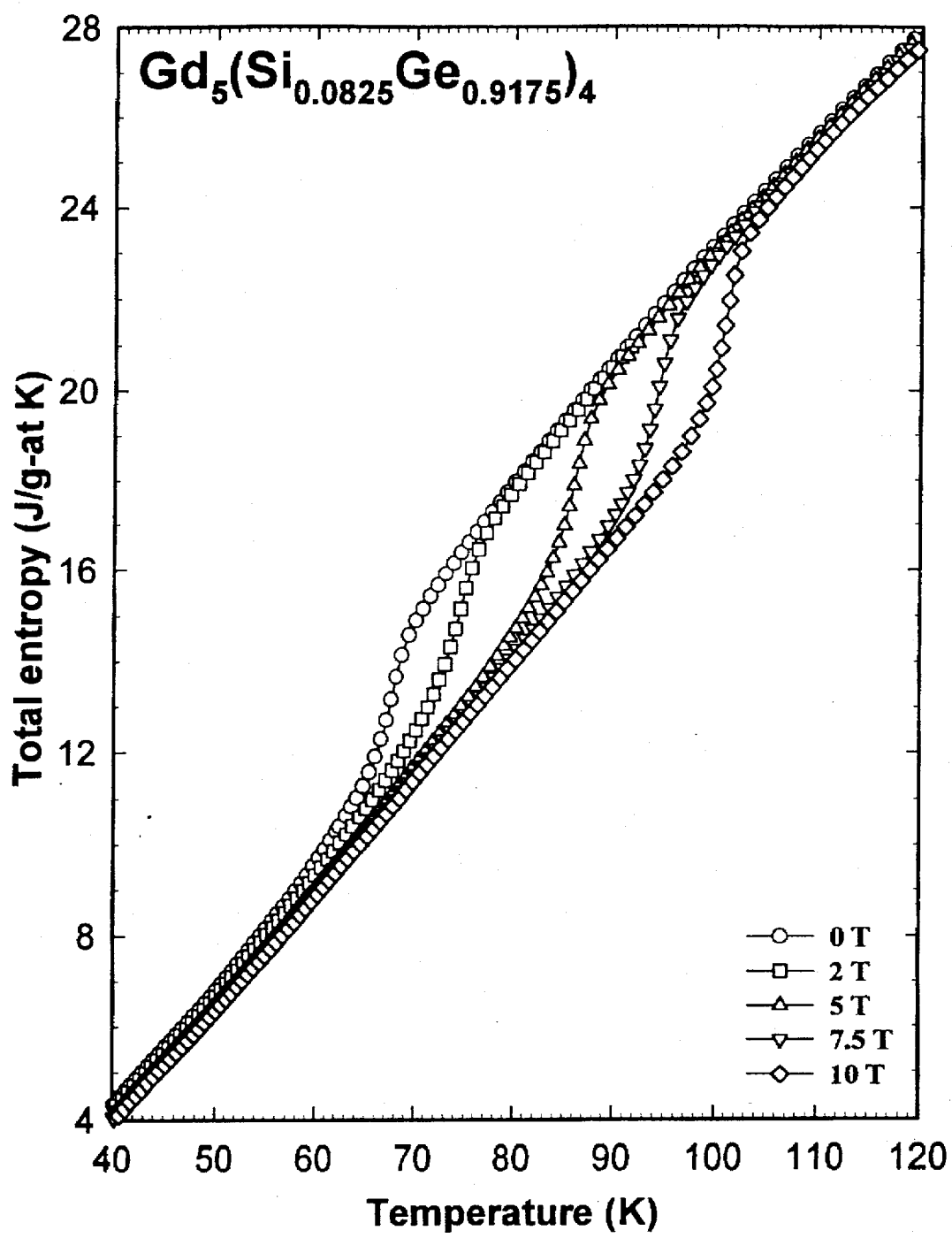

FIG. 6B is a graph of total entropy of $Gd_5(Si_{0.0825}Ge_{0.9175})_4$ in magnetic fields of 0, 2, 5, 7.5, and 10 Tesla from 40 to 120 K.

Figure 6C:
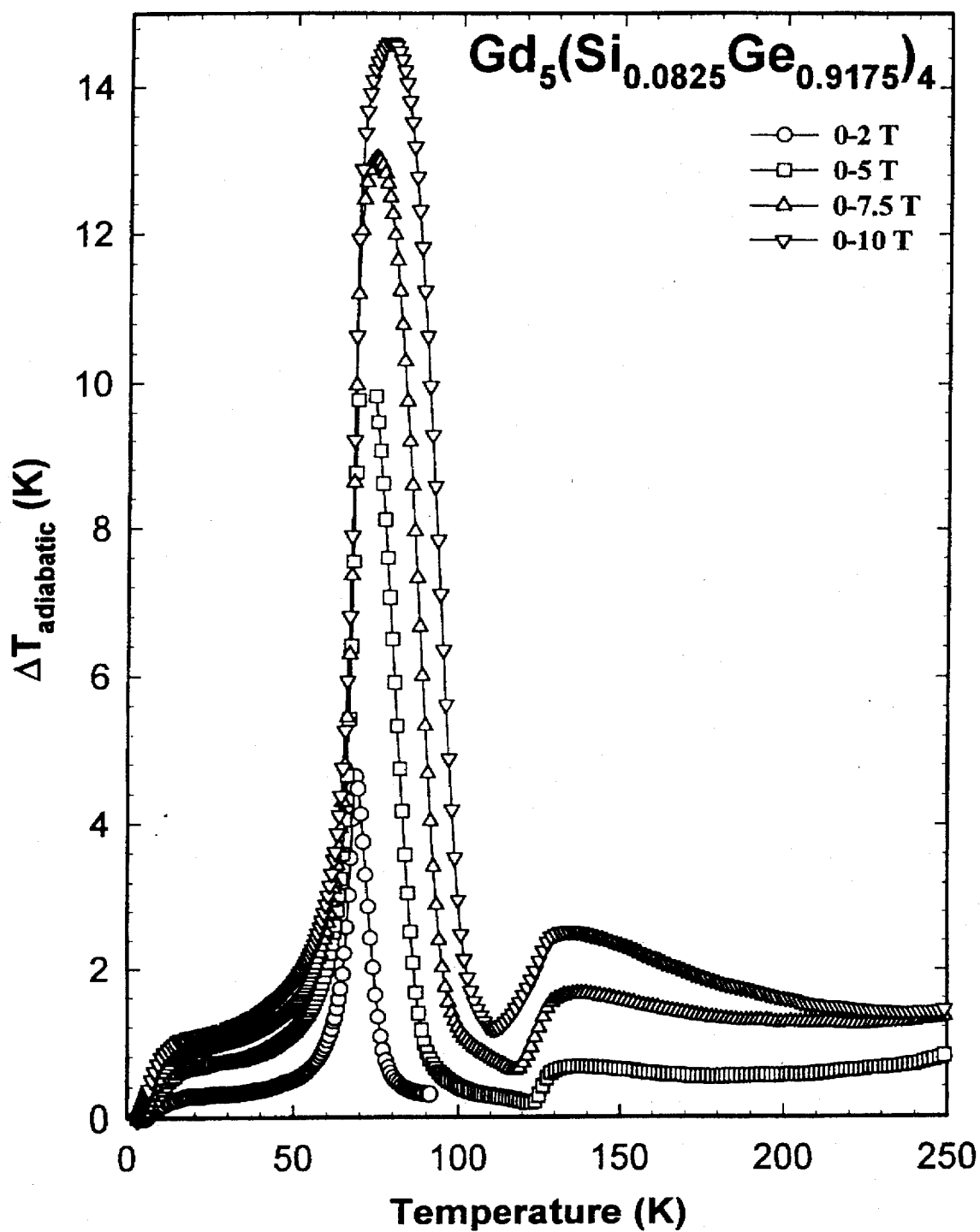

FIG. 6C is a graph of adiabatic temperature change (magnetocaloric effect) versus temperature for $Gd_5(Si_{0.0825}Ge_{0.9175})_4$ from approximately 3.5 K to 250 K estimated from the entropy curves shown in FIG. 6B for a magnetic field change from 0 to 2 Tesla, from 0 to 5 Tesla, from 0 to 7.5 Tesla, and from 0 to 10 Tesla.

Figure 6D:
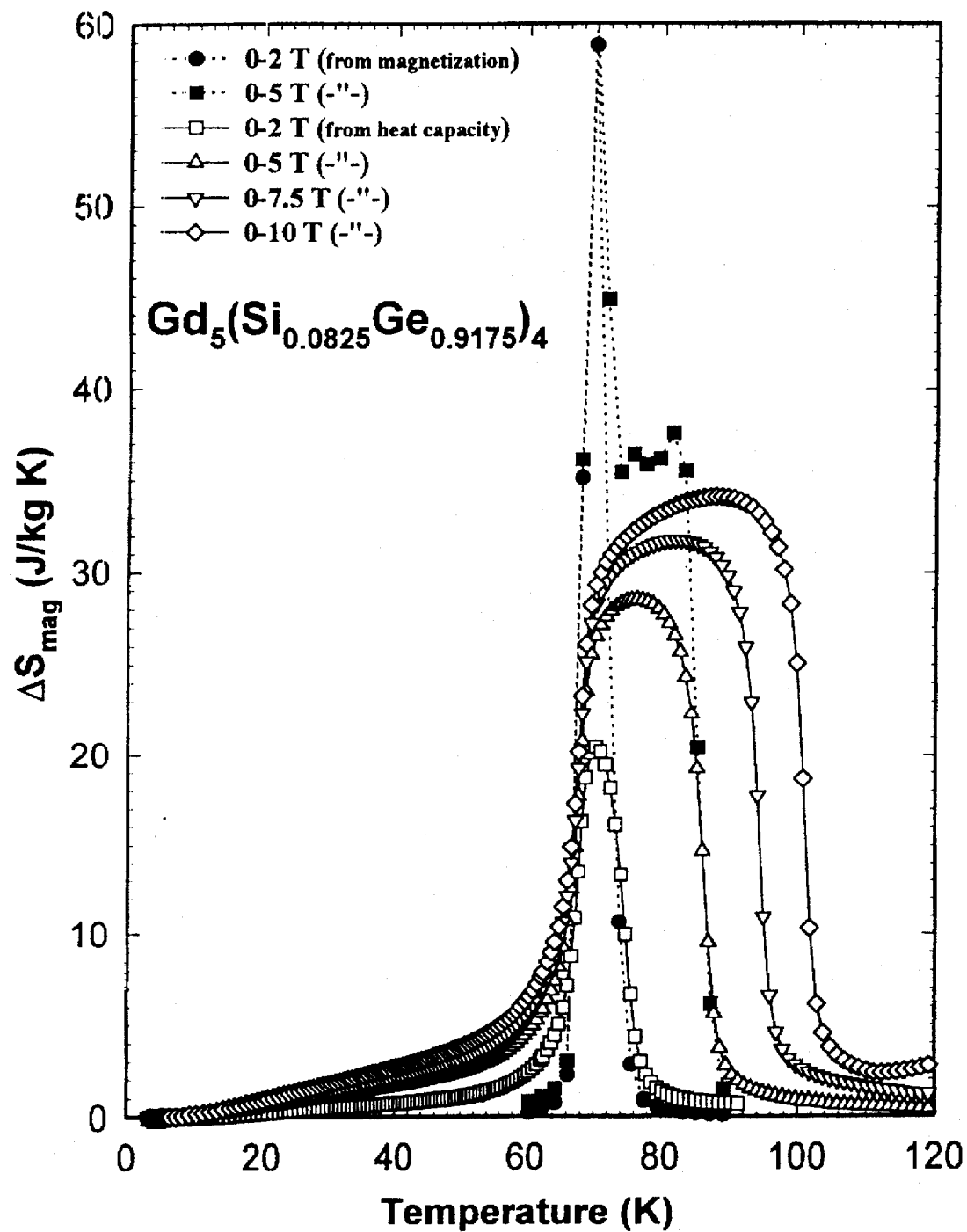

FIG. 6D is a graph of magnetic entropy change versus temperature for $Gd_5(Si_{0.0825}Ge_{0.9175})_4$ estimated from the magnetization measurements (solid symbols, dotted lines) and from heat capacity measurements (open symbols, solid lines) between approximately 3.5 K to 120 K. The lines are guides for the eye.

Figure 6E:
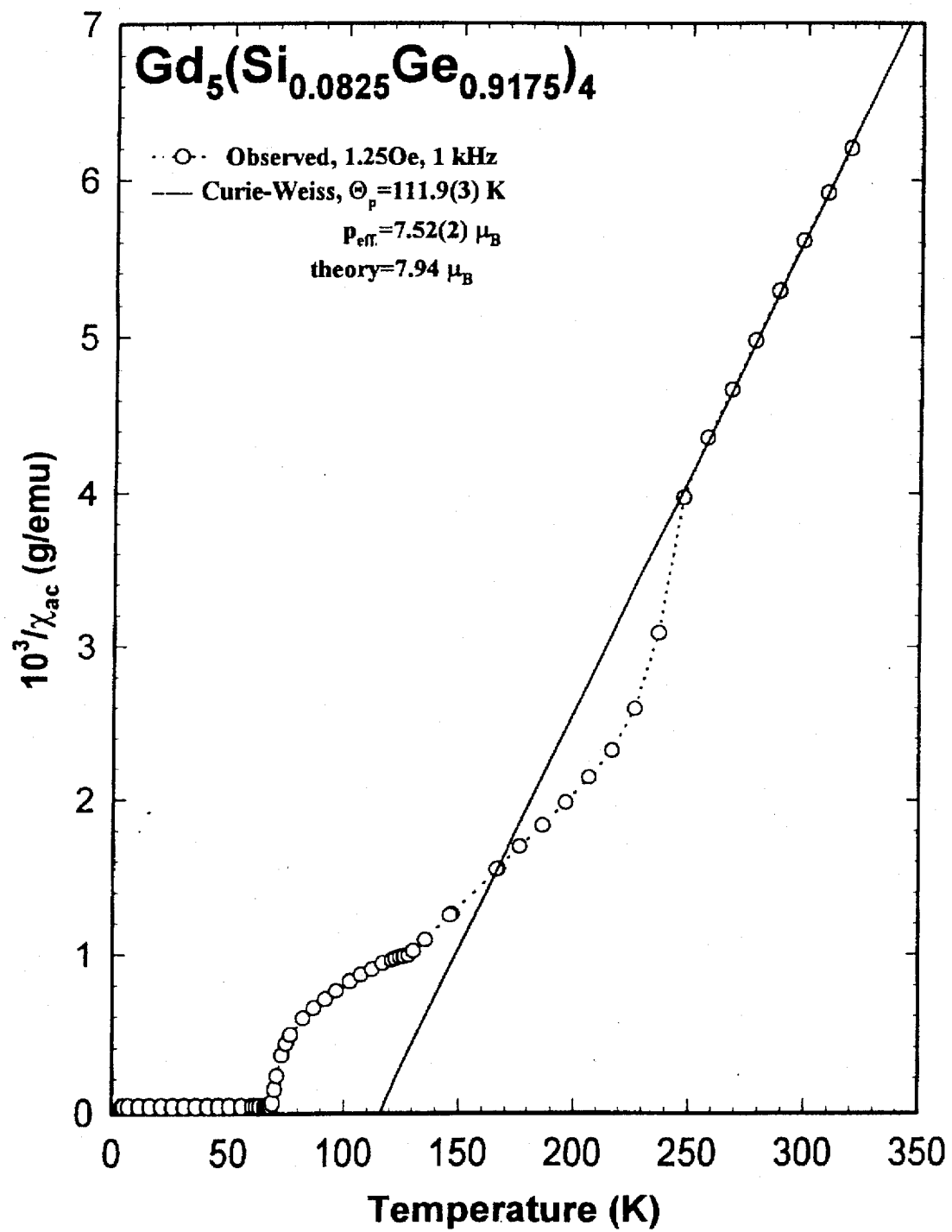

FIG. 6E is a graph of temperature versus inverse ac magnetic susceptibility for $Gd_5(Si_{0.0825}Ge_{0.9175})_4$ from 4.5 K to 325 K at ac field of 1.25 Oe, frequency of 1 kHz, and no bias dc field.

The results shown in FIG. 6A–6E are typical for all alloy compositions in the $Gd_5Ge_4$-based orthohombic phase region (FIG. 1), i.e. x approximately equals 0 to 0.20.

Figure 7A:
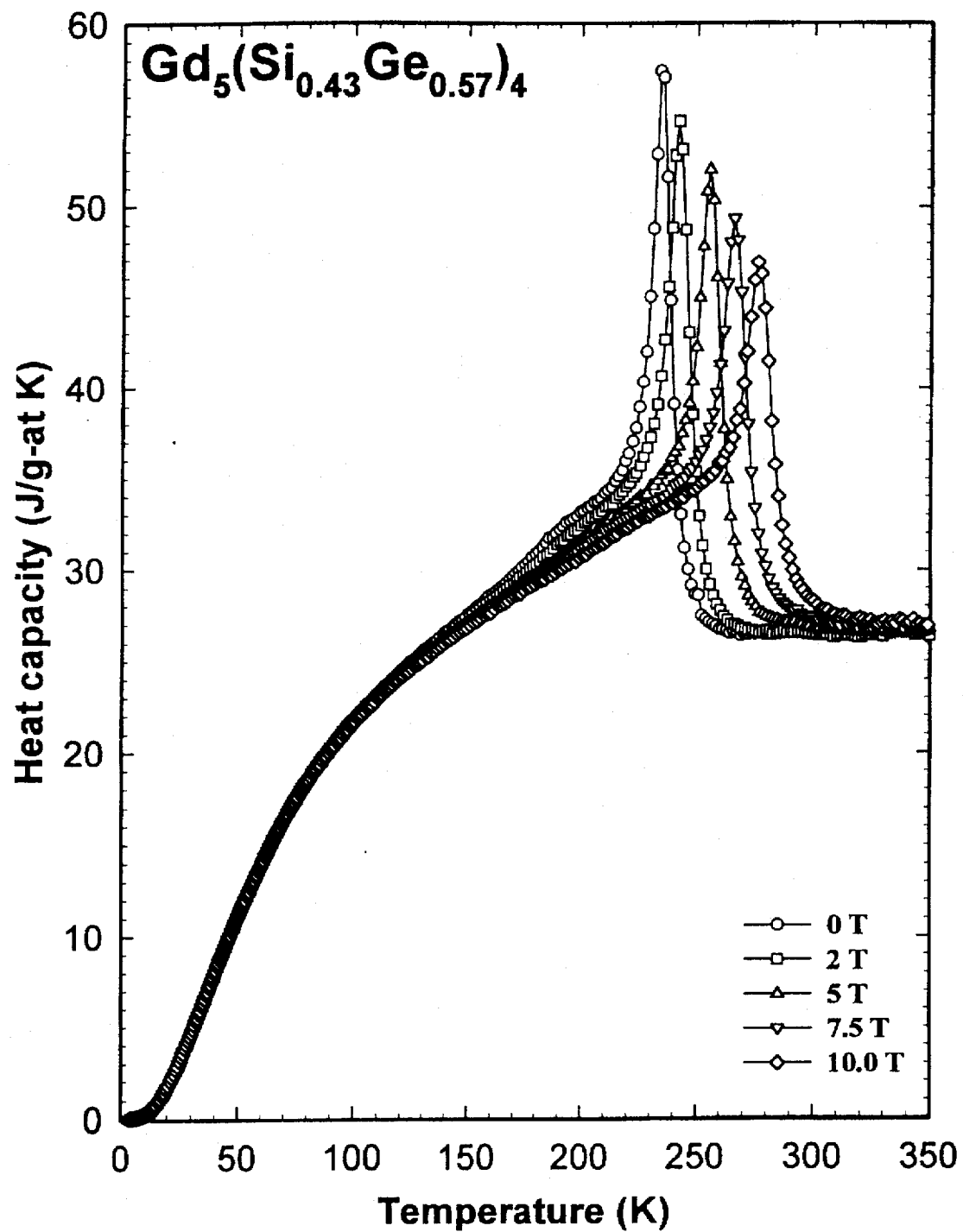

FIG. 7A is a graph of temperature versus heat capacity of $Gd_5(Si_{0.43}Ge_{0.57})_4$ in magnetic fields of 0, 2, 5, 7.5, and 10 Tesla from approximately 3.5 to 350 K.

Figure 7B:
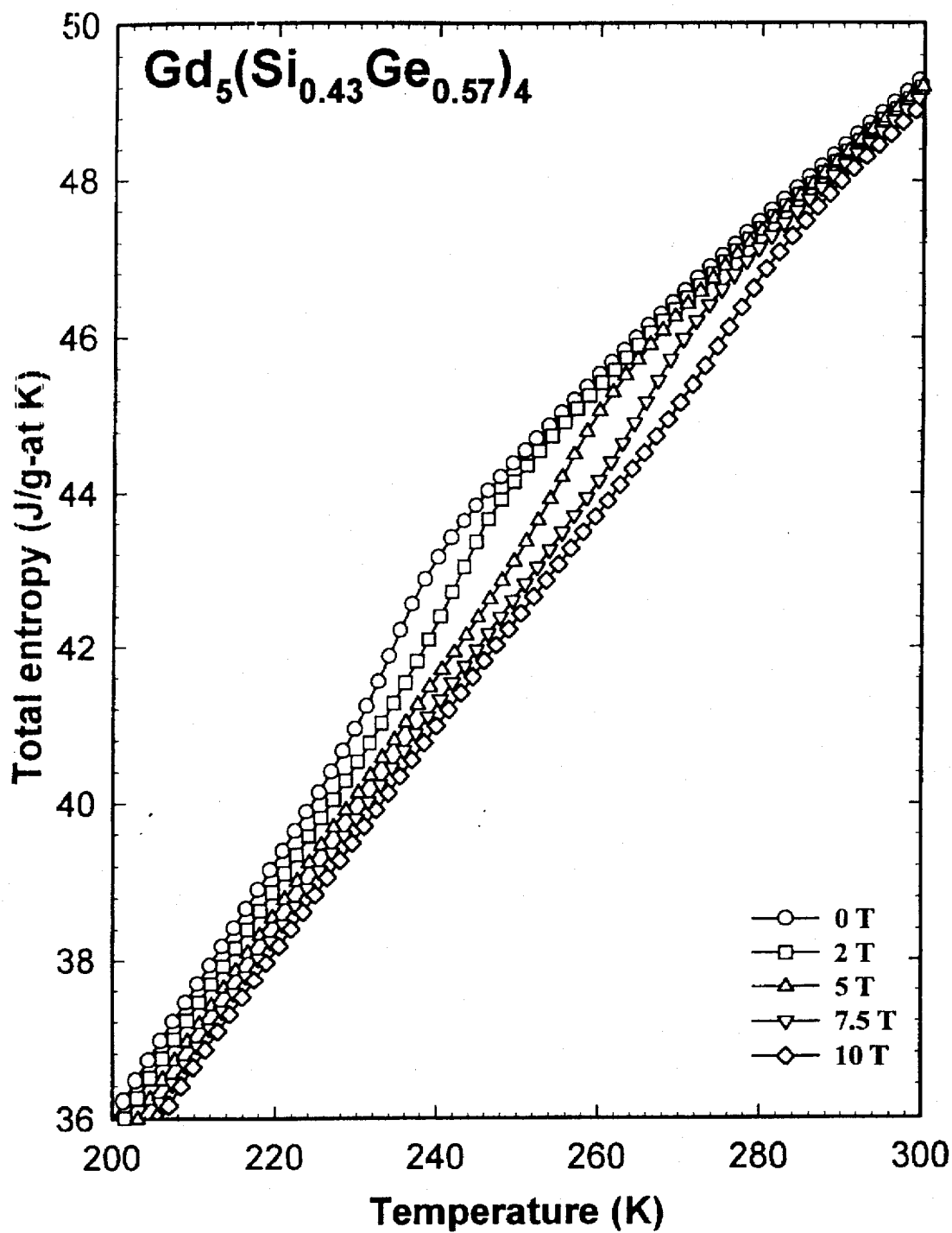

FIG. 7B is a graph of temperature versus total entropy of $Gd_5(Si_{0.43}Ge_{0.57})_4$ in magnetic fields of 0, 2, 5, 7.5, and 10 Tesla from 200 to 300 K.

Figure 7C:
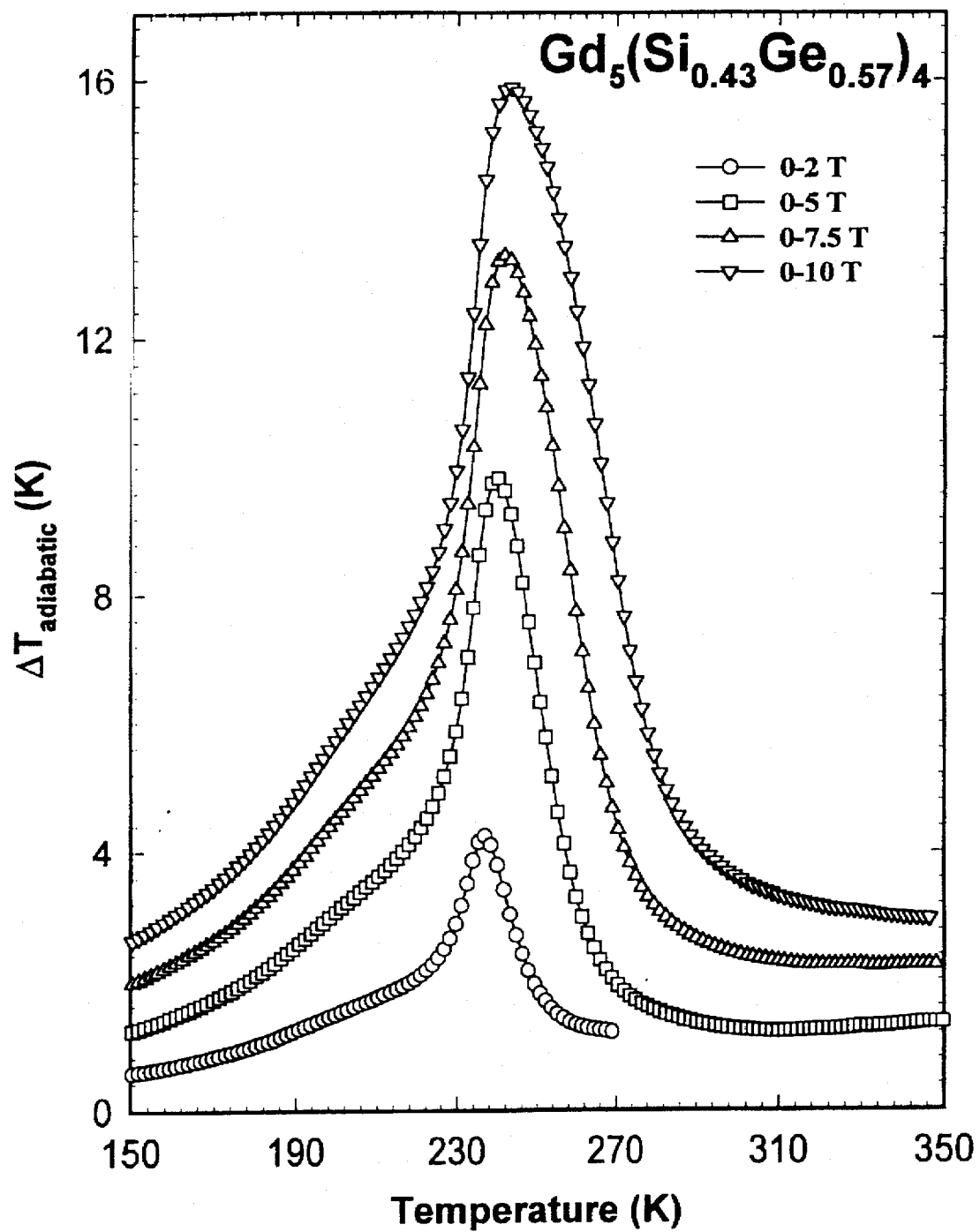

FIG. 7C is a graph of adiabatic temperature change (magnetocaloric effect) versus temperature for $Gd_5(Si_{0.43}Ge_{0.57})_4$ from 150 K to 250 K estimated from the entropy curves shown in FIG. 7B for a magnetic field change from 0 to 2 Tesla, from 0 to 5 Tesla, from 0 to 7.5 Tesla, and from 0 to 10 Tesla.

Figure 7D:
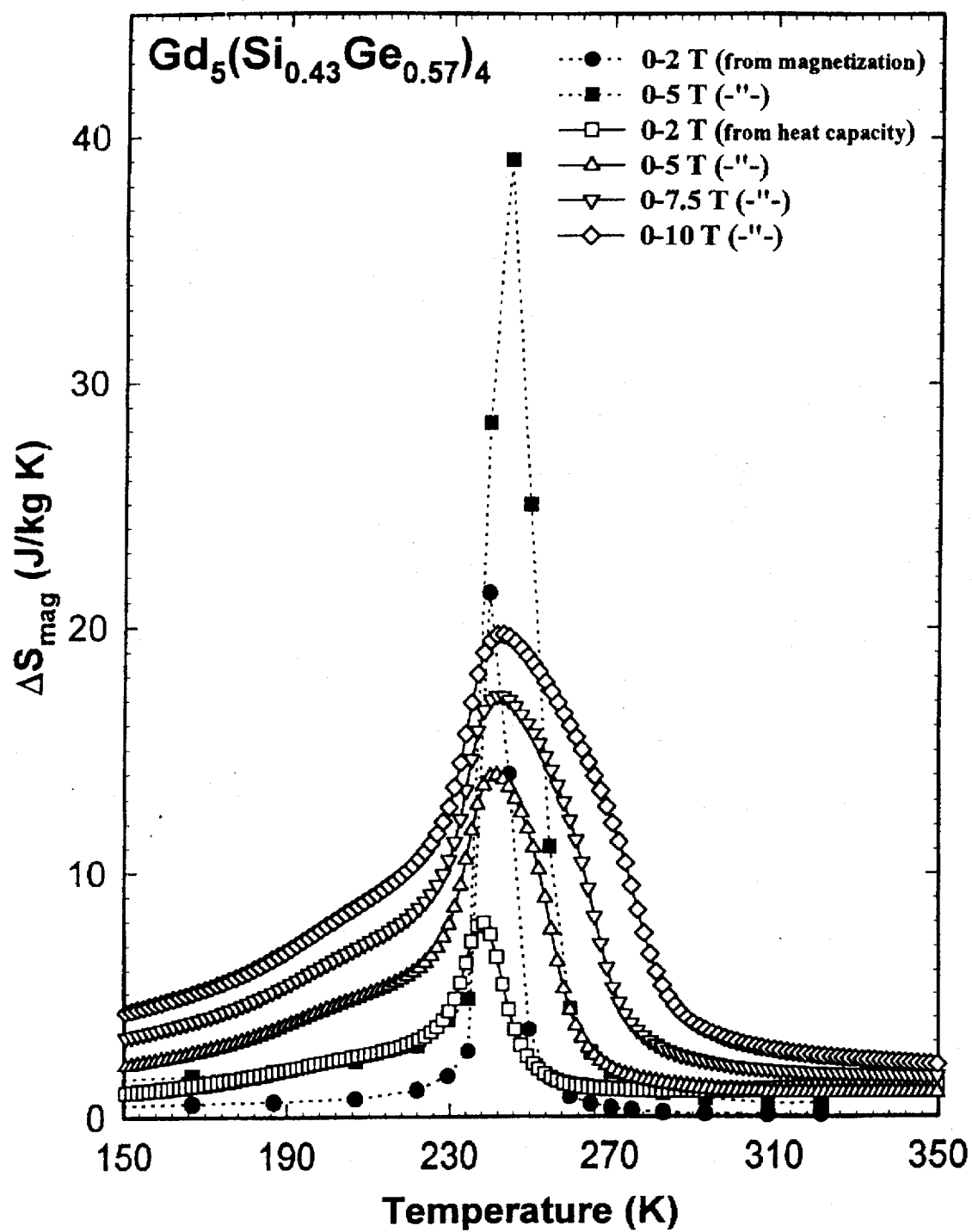

FIG. 7D is a graph of magnetic entropy change versus temperature for $Gd_5(Si_{0.43}Ge_{0.57})_4$ estimated from the magnetization measurements (solid symbols, dotted lines) and from heat capacity measurements (open symbols, solid lines) between 150 K to 350 K. The lines are guides for the eye.

Figure 7E:
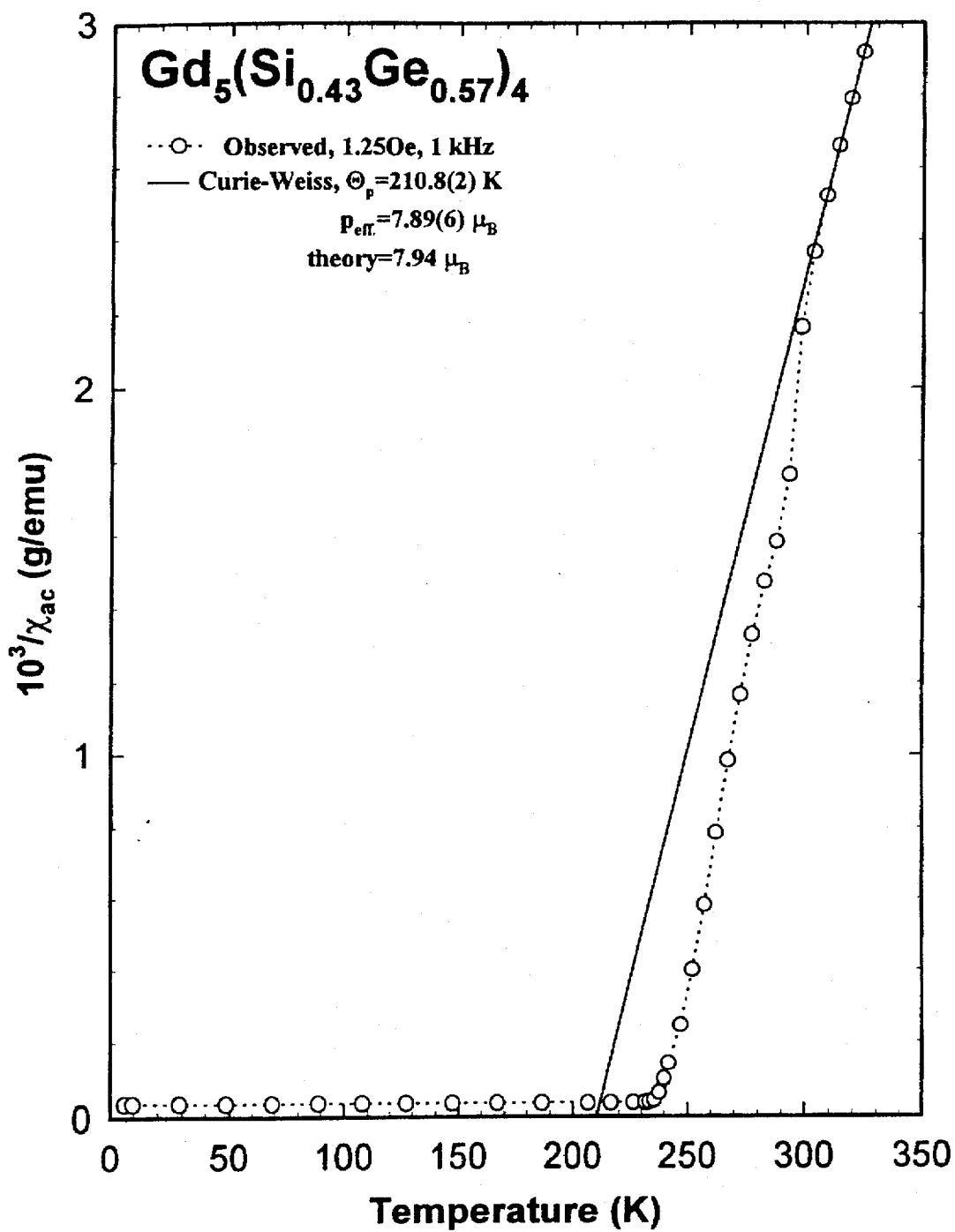

FIG. 7E is a graph of temperature versus inverse ac magnetic susceptibility for $Gd_5(Si_{0.43}Ge_{0.57})_4$ from 4.5 K to 325 K at ac field of 1.25 Oe, frequency of 1 kHz, and no bias dc field.

The behaviors shown in FIGS. 7A–7E are typical for all alloy compositions in the ternary monoclinic phase region (FIG. 1), i.e. x approximately equals 0.25 to 0.50.

Figure 8A:
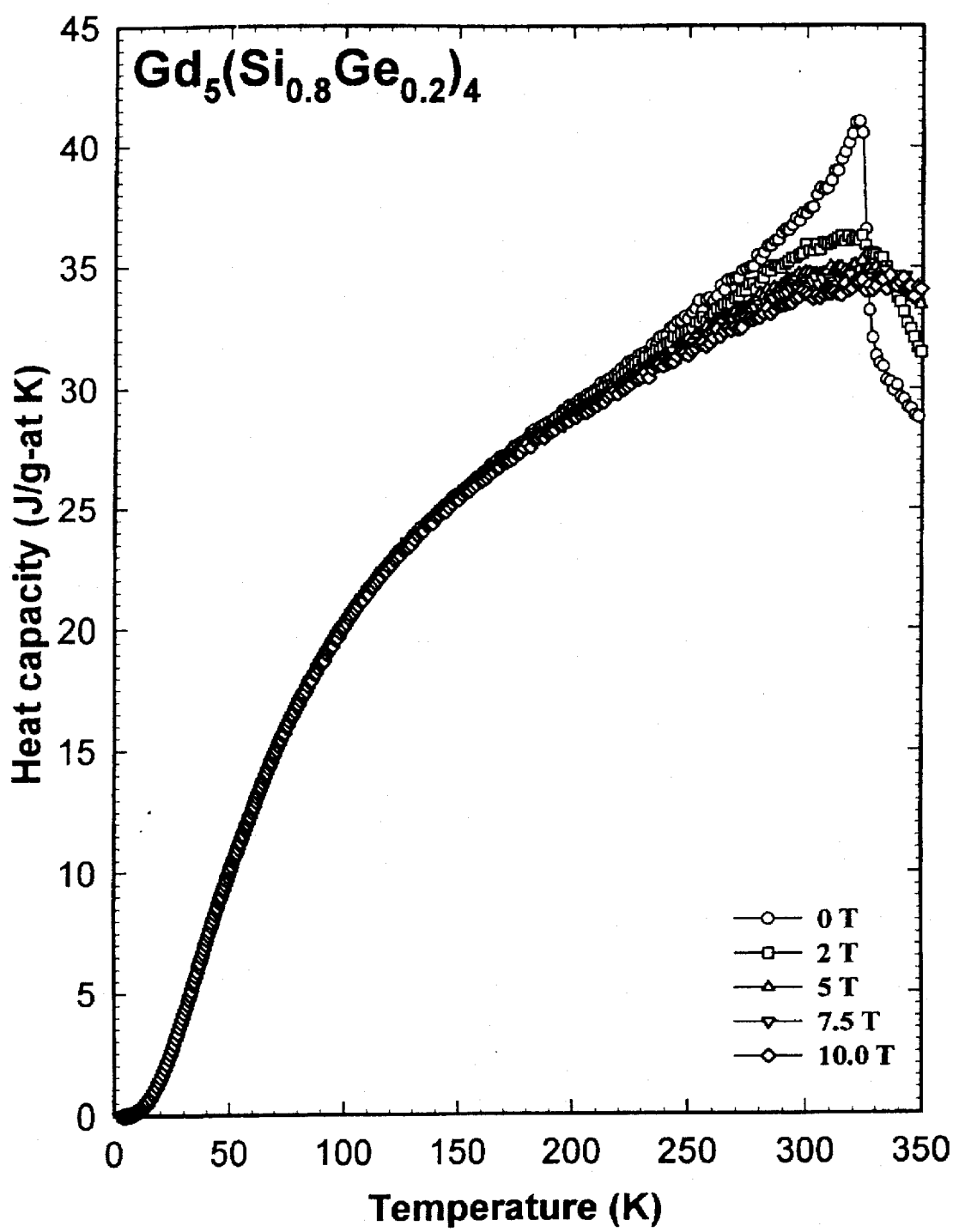

FIG. 8A is a graph of temperature versus heat capacity of $Gd_5(Si_{0.8}Ge_{0.2})_4$ in magnetic fields of 0, 2, 5, 7.5, and 10 Tesla from approximately 3.5 to 350 K.

Figure 8B:
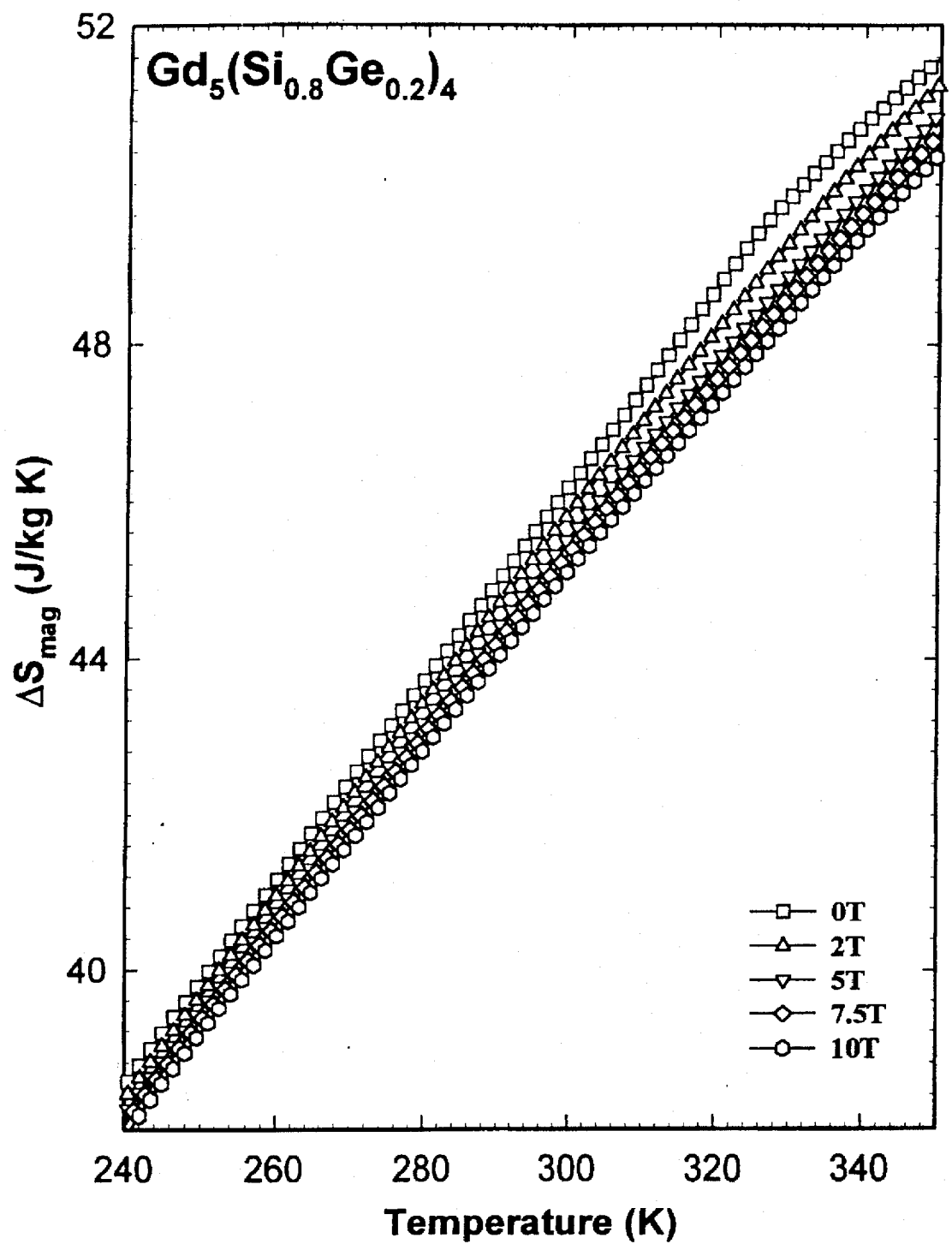

FIG. 8B is a graph of total entropy of $Gd_5(Si_{0.8}Ge_{0.2})_4$ in magnetic fields of 0, 2, 5, 7.5, and 10 Tesla from 240 to 350 K.

Figure 8C:
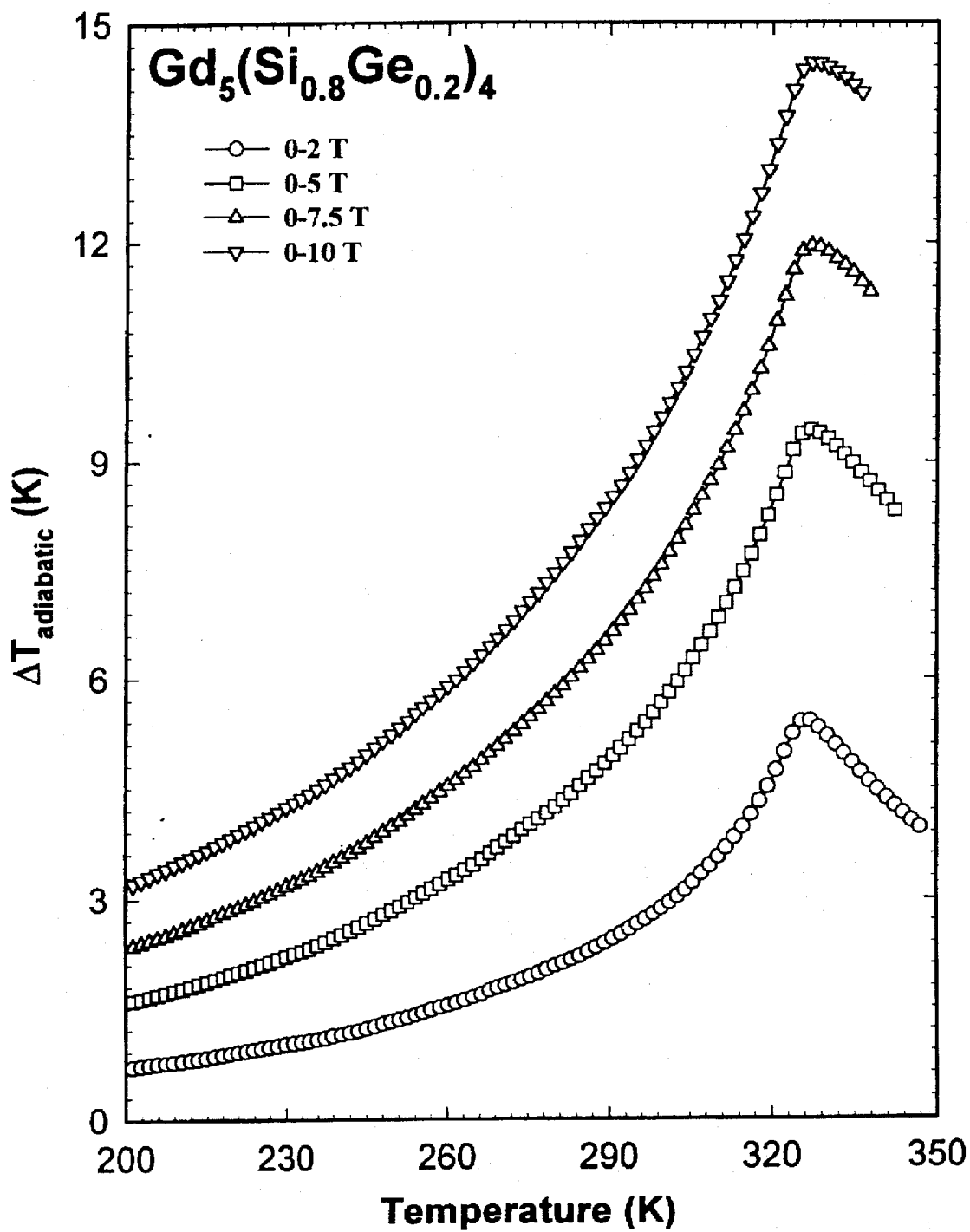

FIG. 8C is a graph of adiabatic temperature change (magnetocaloric effect) versus temperature for $Gd_5(Si_{0.8}Ge_{0.2})_4$ from 200 K to 350 K estimated from the entropy curves shown in FIG. 8B for a magnetic field change from 0 to 2 Tesla, from 0 to 5 Tesla, from 0 to 7.5 Tesla, and from 0 to 10 Tesla.

Figure 8D:
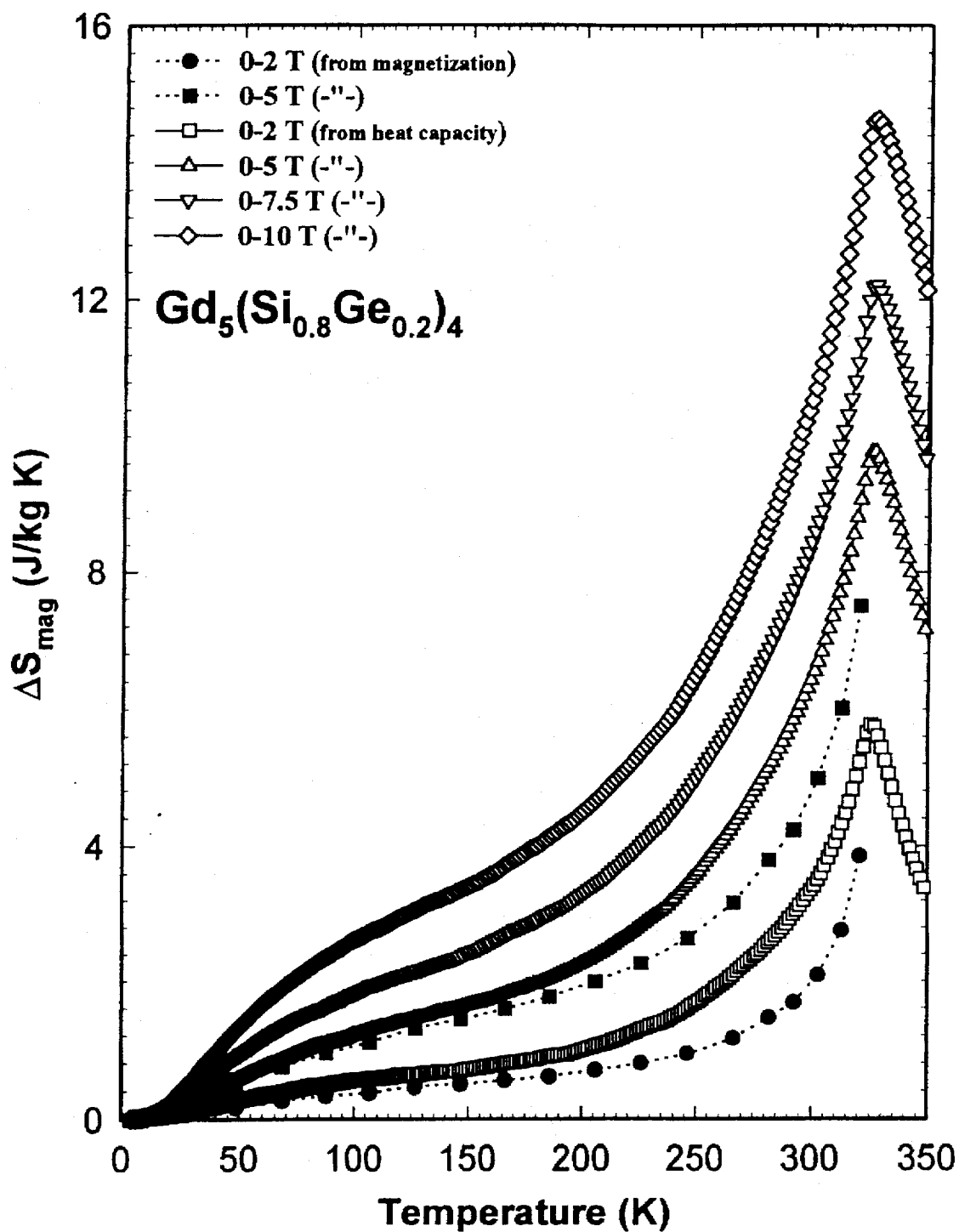

FIG. 8D is a graph of magnetic entropy change versus temperature for $Gd_5(Si_{0.8}Ge_{0.2})_4$ estimated from the magnetization measurements (solid symbols, dotted lines) and from heat capacity measurements (open symbols, solid lines) between 3.5 K to 350 K. The lines are guides for the eye.

The results shown in FIGS. 8A–8D are typical for all alloys in the $Gd_5Si_4$-based orthochombic composition region (FIG. 1), i.e. x approximately equals 0.5 to 1.0.

Figure 9:
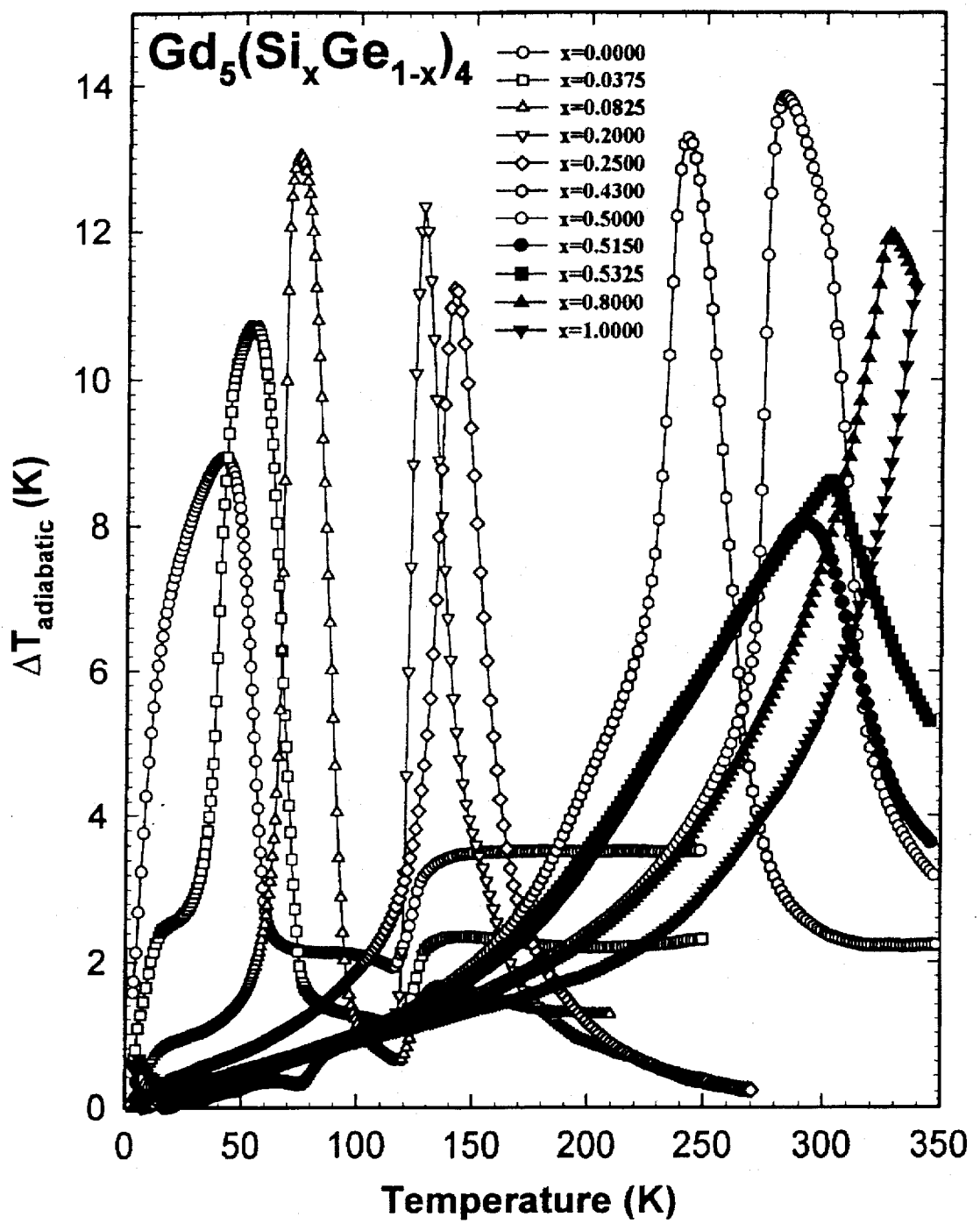

FIG. 9 is a graph of adiabatic temperature change (magnetocaloric effect) for the $Gd_5(Si_xGe_{1-x})_4$ series refrigerant materials for a magnetic field change from 0 to 7.5 Tesla as determined from the magnetic heat capacity.

Figure 10:
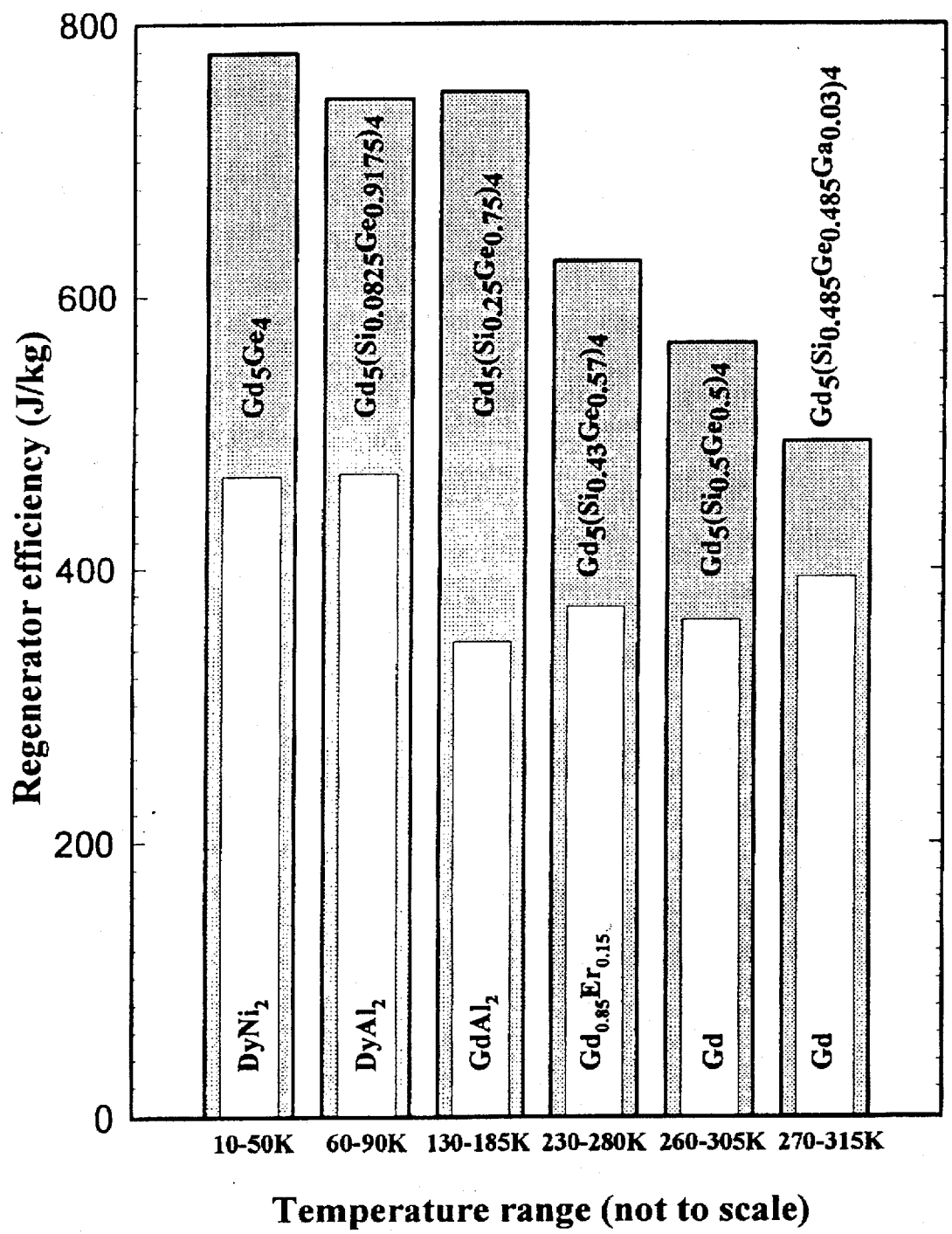

FIG. 10 is a bar graph representation comparing regenerator efficiency parameter (i.e. figure of merit) of the $Gd_5(Si_xGe_{1-x})_4$ series refrigerant materials (shown as the shaded rectangles) in comparison with the best known prototype refrigerants listed (unshaded rectangles) in the same regions of temperature for a magnetic field change from 0 to 5 Tesla.

Figure 11:
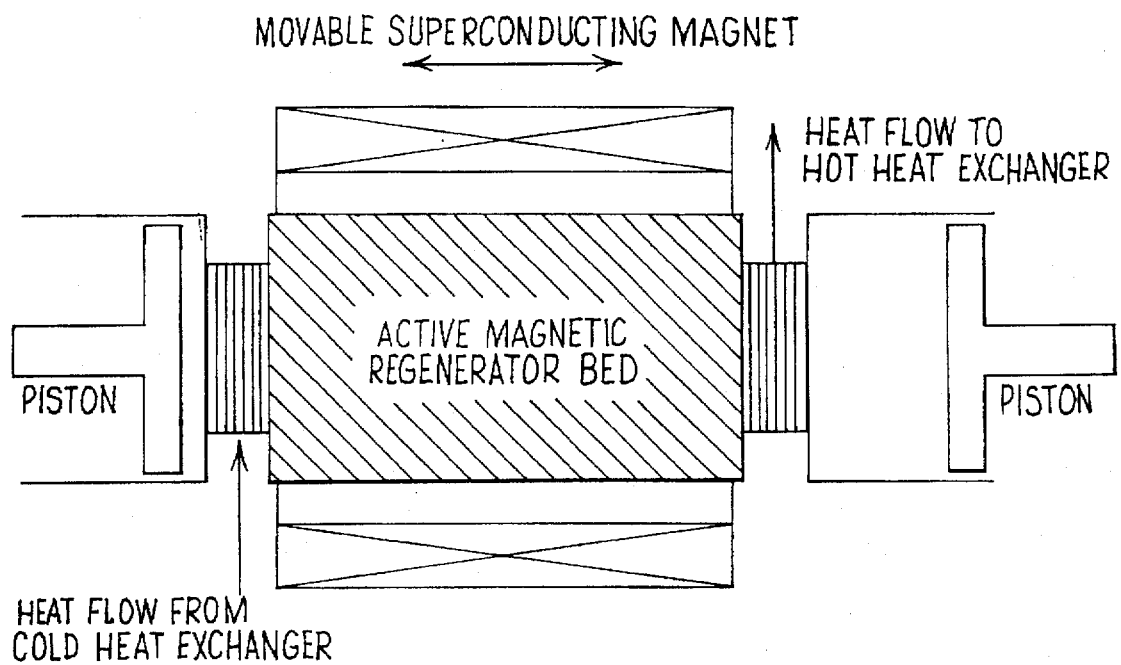

FIGS. 11 and 12 are schematic views of regenerators.

DETAILED DESCRIPTION OF THE INVENTION

An active magnetic regenerator and method in accordance with an embodiment of the present invention employ a magnetic refrigerant that provides extraordinarily high and heretofore undiscovered magnetocaloric effect (magnetic entropy change) based on a reversible first order phase transition upon heating. The reversible first order phase transition provides a sharp reduction in magnetization near the magnetic ordering temperature (Curie temperature) that results in the extraordinarily high magnetocaloric effect (magnetic entropy change). For purposes of illustration, the magnetic refrigerant of the present invention typically exhibits a magnetic entropy change that is at least twice (200%) that exhibited by polycrystalline Gd, which to-date is the best active ferromagnetic refrigerator material near room temperature (i.e. 293 K) in prototype magnetic refrigerators because its Curie temperature is 294 degrees K.

A magnetic refrigerant useful in practicing an embodiment of the present invention consists essentially of about 53 to about 58 atomic % Gd, 0 to about 47 atomic % Ge, and up to about 47 atomic % Si, wherein the total Ge plus Si content is about 42 to about 47 atomic %. The magnetic refrigerant can include nonmagnetic alloying elements, such as Be, Mg, Ca, Zn, Cd, B, Al, Ga, In, Tl, C, Sn, Pb, N, P, As, Sb, Bi, Se, Te, Ti, Zr, Hf, V, Nb, Ta, Cr, Mo, W, and Cu and magnetic alloying elements, such as Mn, Fe, Co and Ni, to optimize certain properties for a given service application. Additions of Fe (e.g. 0.02 w/o—weight %), Ni (e.g. 0.02 w/o), Cu (e.g. 0.02 w/o) provide some improvement in magnetocaloric properties with Ni, Cu, and Fe being most to least effective to this end. Addition of Ga (e.g. 0.02 w/o) increases the Curie temperature of the $Gd_5(Si_xGe_{1-x})_4$ alloy, where x=0.5 by approximately 12 degrees K, while at the same time maintains the extraordinary large magnetocaloric effect. Additions of Co show no noticeable improvement to magnetocaloric properties.

A preferred magnetic refrigerant for a magnetic regenerator consists essentially of about 53 to about 58 atomic % Gd, about 6 to about 25 atomic % Si, and about 20 to about 38 atomic % Ge having a monoclinic or orthorhombic crystal structure and a reversible first order phase transition with changing temperature and magnetic field.

A magnetic refrigerant in accordance with a particularly preferred embodiment of the present invention is represented by the atomic formula $Gd_5(Si_xGe_{1-x})_4$, where x is equal to or less than about 0.55. This magnetic refrigerant not only exhibits the extraordinarily high magnetocaloric effect but also a remanent magnetization that reduces to zero when applied magnetic field falls to zero and no observed magnetic hysteresis down to 4 K.

Moreover, the reversible first order phase transition is tunable from approximately 30 K to approximately 290 K (near room temperature) and above by material compositional adjustments, such as by adjusting the ratio of Si/Ge and/or by inclusion of alloying elements, such as Be, Mg, Ca, Zn, Cd, B, Al, Ga, In, Tl, C, Sn, Pb, N, P, As, Sb, Bi, Se, Te, Ti, Zr, Hf, V, Nb, Ta, Cr, Mo, W, Mn, Fe, Co, Ni and Cu, to this same end.

Further, the regenerator efficiency parameter (figure of merit) for the magnetic refrigerants of the present invention is 24% to 115% better than those of the best known to-date prototype refrigerants.

The aforementioned magneto-thermal properties render the magnetic refrigerant in accordance with the invention significantly more efficient and useful than existing magnetic refrigerants for commercialization of magnetic regenerators and methods. In particular, the present invention provides an active magnetic regenerator and method for refrigerating, air conditioning, liquefaction of low temperature cryogens and other uses, exhibiting significantly improved efficiency and operating temperature range from approximately 30 K to 290 K and above. Advantageously, the magnetic regenerator and method of the invention can be practiced by subjecting the magnetic refrigerant to a relatively high alternating magnetic field, such as 1.5 Tesla and higher, provided by a superconducting magnet for example or to a relatively lower magnetic field, such as 0.5 to 1.5 Tesla, provided by a permanent magnet in order to provide magnetization/demagnetization cycles to achieve the desired active magnetic regeneration magnetic refrigeration. The magnetization/demagnetization cycles are achieved when using a superconducting magnet and when using a permanent magnet by moving the magnetic material in and out of the magnetic field. This can be accomplished by moving either the magnet, or the regenerator, or by a combined movement of both.

The present invention makes it feasible for the first time to use magnetic refrigeration climate control for buildings, home and automotive air conditioners (288 K), freezers for food processing plants and supermarket chillers (255 K), production of chemicals which require cooling, such as chlorine, ammonia, ethylene, and polyethylene, and many other heretofore commercially impractical uses. Moreover, the magnetic refrigeration pursuant to the invention can be used for liquefaction of hydrogen (boiling point 20 K), oxygen (boiling point 90 K), and natural gas methane (boiling point 109 K), propane (boiling point 231 K), and butane (boiling point 273 K).

A magnetic heater/refrigerant in accordance with a particularly preferred embodiment of the present invention is represented by the atomic formula $Gd_5(Si_xGe_{1-x})_4$, where x is equal to or greater than about 0.45 and equal to or less than 1.00. This magnetic heater/refrigerant not only exhibits a high magnetocaloric effect but also a remanent magnetization that reduces to zero when applied magnetic field falls to zero and no observed magnetic hysteresis down to 4 K.

Moreover, the reversible ferromagnetic/paramagnetic second order phase transition is tunable from approximately 280 K (near room temperature) to approximately 350 K by material compositional adjustments, such as by adjusting the ratio of Si/Ge and/or by inclusion of alloying elements, such as Be, Mg, Ca, Zn, Cd, B, Al, Ga, In, Tl, C, Sn, Pb, N, P, As, Sb, Bi, Se, Te, Ti, Zr, Hf, V, Nb, Ta, Cr, Mo, W, Mn, Fe, Co, Ni and Cu to this same end. There are no known magnetic heater/refrigerant materials which have been shown to be operable above room temperature as a magnetic heat pump and/or refrigerant.

The aforementioned magneto-thermal properties render the magnetic heater/refrigerant in accordance with the invention quite efficient and useful for commercialization of magnetic regenerators and methods. In particular, the present invention provides an active magnetic regenerator and method for refrigerating from approximately 350 K down to room temperature, and for heating (as a heat pump) from room temperature (or slightly below) to approximately 350 K, exhibiting good efficiency, and operating temperature range from approximately 280 K to 350 K. Advantageously, the magnetic regenerator and method of the invention can be practiced by subjecting the magnetic heater/refrigerant to a relatively high alternating magnetic field, such as 1.5 Tesla and higher, provided by a superconducting magnet for example, or a relatively lower magnetic field, such as 0.5 to 1.5 Tesla, provided by a permanent magnet in order to provide magnetization/demagnetization cycles to achieve the desired active magnetic regeneration magnetic heating/ or refrigeration. The magnetization/demagnetization cycles are achieved when using a superconducting magnet and when using a permanent magnet by moving the magnetic material in and out of the magnetic field which can be accomplished by moving either the magnet, or the regenerator, or by a combined movement of the two. The present invention makes it feasible for the first time to use magnetic low level heating for climate control for buildings, home and automobile, and chemical processing.

FIG. 11 illustrates schematically an embodiment of the invention of a magnetic regenerator using a moving superconducting magnet to subject the magnetic refrigerant regenerator bed to an alternating magnetic field. The magnetic regenerator bed includes any one of the $Gd(Si_xGe_{1-x})_4$ alloys described above (for x equal to or less than 0.55) or a layered combination thereof, with each layer arranged in a sequence with increasing Curie temperature from the cold end to the hot end. The pistons shown are used to arrange the flow of heat transfer media (liquid or gas) from the cold end to the hot end and back from the hot end to the cold end. For the magnetic heater/refrigerant the same arrangement would be used, except the alloys would have a composition with x equal to or greater than 0.45 and equal to or less than 1.00.

Figure 12A:
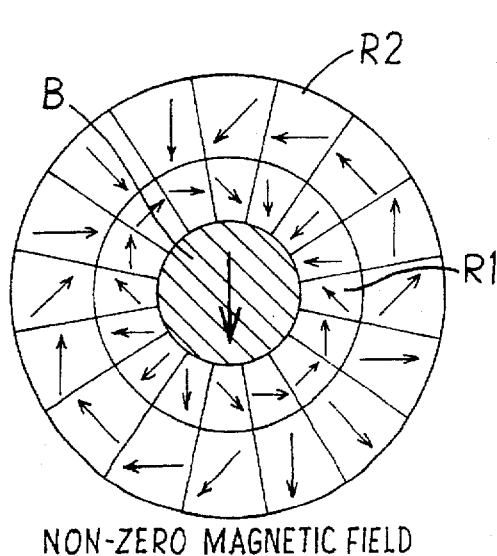
Figure 12B:
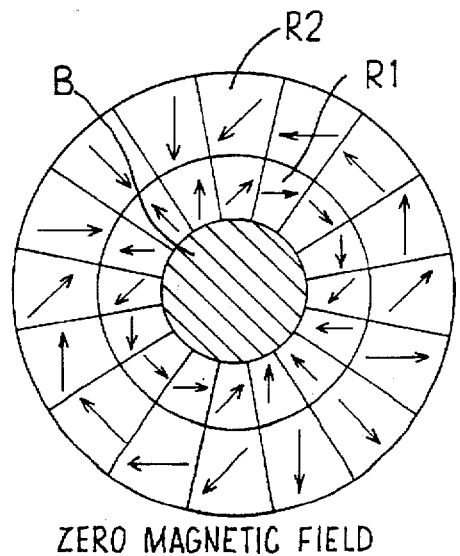

FIG. 12 illustrates schematically another embodiment of the invention of a magnetic regenerator using a permanent magnet to subject an active magnetic regenerator bed B comprising the present invention to cyclic magnetization/ demagnetization, which in this illustration is generated by two rotating "magic" rings R1, R2 comprising suitable permanent magnets such as $SmCo_5$-based or $Nd_2Fe_{14}B$-based magnets. Rotation of the inner ring R1 with respect to the outer ring R2 produces a varying magnetic field. In FIG. 12A, the large arrow in the center indicates the direction of the net magnetic field (i.e. north pole) at the moment the two rings are positioned as shown relative to each other. In FIG. 12B the magnetic field is zero when the two rings are positioned as shown. The magnetocaloric material is shown in the center of the inner ring R1. A heat transfer fluid (not shown), such as water, mixture of water and alcohol, nitrogen gas, or helium gas, flows into or out of the plane of the drawing to transfer heat from the cold end to the hot end of the refrigerator. The small arrows in the various segments of the inner and outer rings R1, R2 schematically indicate the directions of the north poles in each segment.

The invention is not limited to the particular embodiment of FIGS. 11 and/or 12 and can be practiced using other methods to impose an alternating magnetic field on the magnetic regenerator material.

As mentioned hereabove, the magnetic refrigerant for practicing the invention consists essentially of a $Gd_5(Si_xGe_{1-x})_4$ refrigerant where x is equal to or less than about 0.55. The invention envisions selecting values of x from 0 to about 0.55 to tune or adjust the Curie temperature over an extraordinarily wide range from approximately 30 K to approximately 290 K (near room temperature) and above without loss of the extraordinarily high magnetocaloric effect and other advantageous properties to suit a particular operating temperature range for the magnetic regenerator. Moreover, the inclusion of certain of the aforementioned alloying elements, such as Ga in an amount up to about 10 atomic percent and Ni in an amount up to about 10 atomic percent, can be made to adjust the Curie temperature. The extraordinarily high range of adjustment of the Curie temperature in this manner without loss of the extraordinarily high magnetocaloric effect has not been heretofore possible with other prototype magnetic refrigerants. The invention thus is further advantageous in that the Curie temperature can be so adjusted or tuned over such a wide range to suit a particular operating temperature range for the magnetic regenerator while retaining the advantageous properties of the refrigerant.

As mentioned hereabove, the magnetic heater/refrigerant for practicing the invention consists essentially of $Gd_5(Si_xGe_{1-x})_4$ refrigerant where x is equal to or greater than about 0.45 and equal to or less than 1.00. The invention envisions selecting values of x from about 0.45 to 1.00 to tune or adjust the Curie temperature over temperature range from approximately 280 K (near room temperature) to approximately 350 K and above without loss of the high magnetocaloric effect and other advantageous properties to suit a particular operating temperature range for the magnetic regenerator. Moreover, inclusion of alloying elements, such as Ga in an amount of about 1 to about 10 atomic percent and Ni in an amount of about 1 to about 10 atomic percent can be made to adjust the Curie temperature. The invention thus is further advantageous in that the Curie temperature can be so adjusted or tuned over such a range to suit a particular operating temperature range for the magnetic regenerator while retaining the advantageous properties of the heater/refrigerant.

The magnetcaloric effect (MCE) is the temperature change in response to application or removal of a magnetic field. The MCE exists because moderate magnetic fields (e.g. less than 10 Tesla) do not have any effect on electronic and lattice entropy of a crystalline solid, but such fields do have an influence on magnetic order and, therefore, the magnetic portion of total entropy of the crystalline solid. The effect of magnetic field on the magnetic entropy is given by the Maxwell relation:

$$[dS_{mag}/dH]_T = [dM/dT]_H$$

where M is magnetization, T is absolute temperature, and H is magnetic field strength, and the magnitude of adiabatic temperature rise ($dT_{ad}$) therefore can be expressed as $dT_{ad} = (dS_{mag}T)/C_H$ where $C_H$ is heat capacity as a function of applied magnetic field H. Although the last equation has little practical use since both $C_H$ and $dS_{mag}$ are usually unknown apriori functions of the magnetic field and the temperature, it establishes that MCE ($dT_{ad}$) is inversely proportional to heat capacity. This equation also yields another important consequence that the MCE can be expressed both in terms of the adiabatic temperature rise ($dT_{ad}$) and the magnetic entropy change ($dS_{mag}$) with the latter being the measure of cooling capacity of the magnetic material.

The active magnetic regenerator and method of the present invention involve in one embodiment a magnetic refrigerant with a Si:Ge ratio equal to or less than about 1.0 that provides extraordinarily high and heretofore undiscovered magnetocaloric effect (magnetic entropy change) based on a reversible ferromagnetic/antiferromagnetic or ferromagnetic-II/ferromagnetic-I (where I is the high temperature phase and II is the low temperaure phase) first order phase transition that provides a sharp reduction in magnetization in a narrow temperature range near the magnetic ordering temperature (Curie temperature). In particular, the magnetic refrigerant exhibits a ferromagnetic phase with a large magnetic moment that changes to antiferromagnetic phase with a low or near zero magnetic moment upon heating and that provides a large dM/dT as compared to a second order ferromagnetic to paramagnetic transition. An antiferromagnetic phase is a material in which the magnetic moments are aligned antiparallel and there is no net magnetic moment.

In addition the active magnetic regenerator and method of the present invention involve in another embodiment a magnetic heater/refrigerant with a Si:Ge ratio greater than about 1.0 that provides a high magnetocaloric effect (magnetic entropy change) based on a reversible ferromagnetic/paramagnetic second order phase transition that provides a reduction in the magnetization near the magnetic ordering temperature (Curie temperature). In particular, the magnetic refrigerant exhibits a ferromagnetic phase with a large magnetic moment that changes to a paramagnetic phase with a low or near zero magnetic moment upon heating and that provides a reasonably large dM/dT. A paramagnetic phase is a material with random magnetic moments with no net magnetic moment.

A total of twelve (12) samples of the $Gd_5(Si_xGe_{1-x})_4$ refrigerant where x selected from 0 to 1 were prepared by arc melting of the pure elemental consituents in an argon atmosphere under ambient pressure of about 1 atmosphere. The as-cast samples were not heat treated since both terminal compounds ($Gd_5Si_4$ and $Gd_5Ge_4$) are high temperature phases that decompose during annealing at 700 to 900 degrees C.

All as-cast samples were single phase with no detectable amount of any other intermetallic phases with different Gd:(Si+Ge) ratio. The phase purity was established by x-ray powder diffraction and by measurements of magnetic susceptibility and heat capacity of all as-cast samples.

The x-ray diffraction data indicate that there are two extended terminal solid solution regions and a ternary phase in the $Gd_5(Si_xGe_{1-x})_4$ system even though both terminal intermetallics have the same crystal structure; namely, orthorhombic $Sm_5Ge_4$-type -crystal structure. Up to 50 atomic % Ge is soluble in $Gd_5Si_4$ and up to 20 atomic % Si is soluble in $Gd_5Ge_4$. The ternary intermetallic $Gd_5(Si_xGe_{1-x})_4$ has a monoclinic crystal structure which is a derivative from the parent orthorhombic $Sm_5Ge_4$-type crystal structure and extends from the composition $Gd_5(Si_2Ge_2)$ to $Gd_5(Si_{0.96}Ge_{3.04})$, see FIG. 1.

A two phase region was detected between the $Gd_5Ge_4$-based solid solution and the silicon-poor boundary of the ternary monoclinic phase. A narrow two phase region extends from approximately 20 to approximately 24 atomic % Si.

The heat capacity in a zero magnetic field and in magnetic fields of 2, 5, 7.5 and 10 Tesla from approximately 3 K to 350 K was measured within an accuracy of better than 1% using an automated heat pulse calorimeter described in copending application entitled CALORIMETRIC SYSTEM (attorney docket No. ISU 2056) of common assignee herwith, the teachings of which are incorporated herein by reference with respect to the calorimeter. The calorimeter comprised a liquid helium cooled 12 Tesla superconducting magnet manufactured by Cryogenic Consultants Ltd., London, England equipped with a room temperature double insulated insert in which a calorimetric insert having a liquid helium/nitrogen pot and sample holder was positioned. Heat capacity data were collected using automated data acquisition system based on an IBM-compatible PC and high precision electronics manufactured by Keithley. The temperature of the sample was measured using a CERNOX resistance temperature sensor manufactured and calibrated in accordance with International Temperature Scale of 1990 (ITS-1990) by the Lake Shore Cryotronics, Inc., USA. The calorimeter itself was calibrated using the 1965 Calorimetric Conference copper standard. The ac and dc magnetic susceptibility and dc magnetization from approximately 4.2 to 320 K was measured using a Lake Shore ac/dc magnetometer, model No. 7225 in bias dc magnetic fields ranging from 0 to 5.5 Tesla. The magnetocaloric properties of the samples were evaluated from the dc magnetization using the aforementioned Maxwell relation; and from the zero field and magnetic field heat capacity by integrating the zero magnetic field heat capacity and magnetic field heat capacity data with respect to the ratio C/T and temperature to determine the total entropy in a zero magnetic field and in a non-zero magnetic field, respectively, then by determining the isothermal difference from the total entropy curves to evaluate the $dS_{mag}$ (i.e. the magnetic entropy change), and by determining the isentropic difference between the total entropy curves to evaluate the $dT_{ad}$ (i.e. the magnetocaloric effect).

Figure 1:
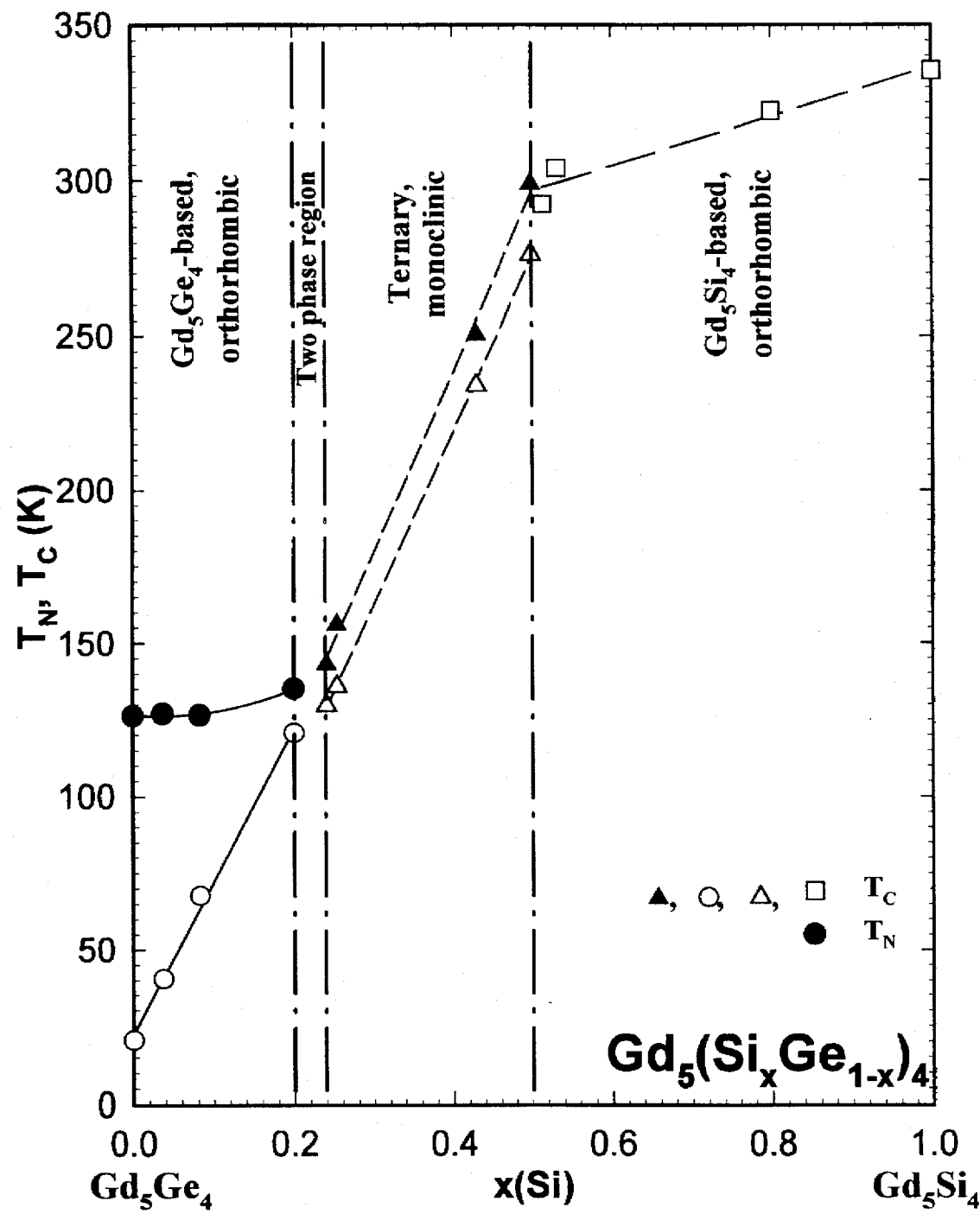
FIG. 1 is a magnetic phase diagram of the pseudobinary system $Gd_5Si_4$—$Gd_5Ge_4$ as a function of Si concentration at zero magnetic field. The solid and dashed lines drawn through the data points show magnetic phase boundaries. The dot-dashed lines show the crystallographic phase boundaries in the system. $T_C$ is the Curie temperaure and $T_N$ is the Néel temperature.

The magnetic phase diagram at zero magnetic field in the $Gd_5(Si_xGe_{1-x})_4$ system as a function of Si concentration is shown in FIG. 1 and is derived from heat capacity and ac susceptibility measurements.

The direct influence of composition and crystal structure on the magnetic behavior is apparent. The $Gd_5Si_4$-based solid solution has a simple ferromagnetic ground state, and the Curie temperature is gradually lowered with increasing concentration of Ge from 335 K to 292 K. When Si concentration reaches the first critical concentration (x=about 0.5), the parent orthorhombic $Gd_5Si_4$ structure undergoes a monoclinic distortion, and the intermetallic compound is no longer a simple ferromagnet. Initially it orders ferromagnetically and then upon further cooling it undergoes a reversible first order phase transition from a ferromagnet-I to a ferromagnet-II. The inventors' studies of temperature and field dependences of the dc magnetization, and ac magnetic susceptibility near the ordering temperatures showed that the net magnetization of the first (higher temperature) ordered phase corresponds to ⅖ of that which is observed upon second(lower temperature) ordering. These numbers agree quite well with the details of the crystal structure of the monoclinic phase, which consists of 5 crystallographically inequivalent magnetic Gd atoms. That is, the higher temperature second order phase transition from paramagnet to ferrogmagnet-I leads to a magnetic structure, with just 2 out of total 5 magnetic sublattices being ordered, while at the lower temperature first order phase transition from ferromagnet-I to ferromagnet-II all 5 of the independent magnetic sublattices are ordered.

Both Curie temperature and the Néel temperatures decrease rapidly with decreasing Si content until the second critical concentration is reached and a second crystal structure change occurs. At x=about 0.2, the distorted monoclinic structure becomes again orthorhombic, and this crystallographic transition changes the higher temperature magnetic structure from ferromagnet-I to antiferromagnet and also nearly freezes the Néel temperature, while the Curie temperature continues to decrease proportionally with the reduction of the amount of Si present.

These drastic differences between the three regions are maintained in magnetic fields of up to 10 Tesla. Above the Néel and Curie temperatures, the magnetic susceptibility of the samples obey the Curie-Weiss law with an effective magnetic moment close to that of $Gd^{+3}$.

Figure 2B:
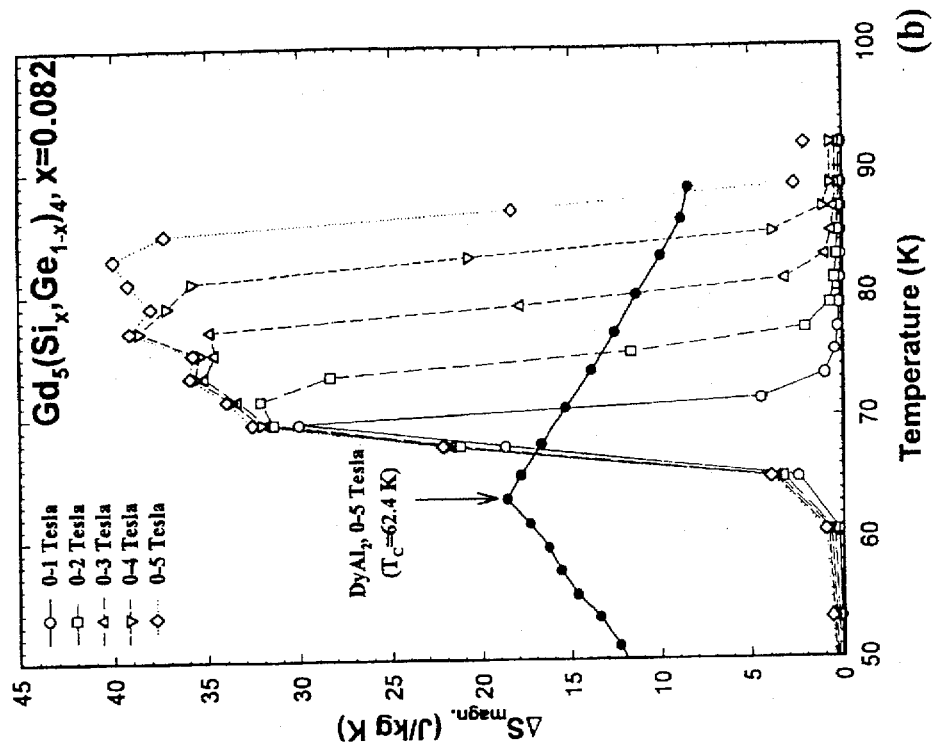
FIG. 2B is a graph of the corresponding temperature versus isothermal magnetic entropy change for a magnetic field change from 0 to 1, 0 to 2, 0 to 3, 0 to 4, and 0 to 5 Tesla.
Figure 2A:
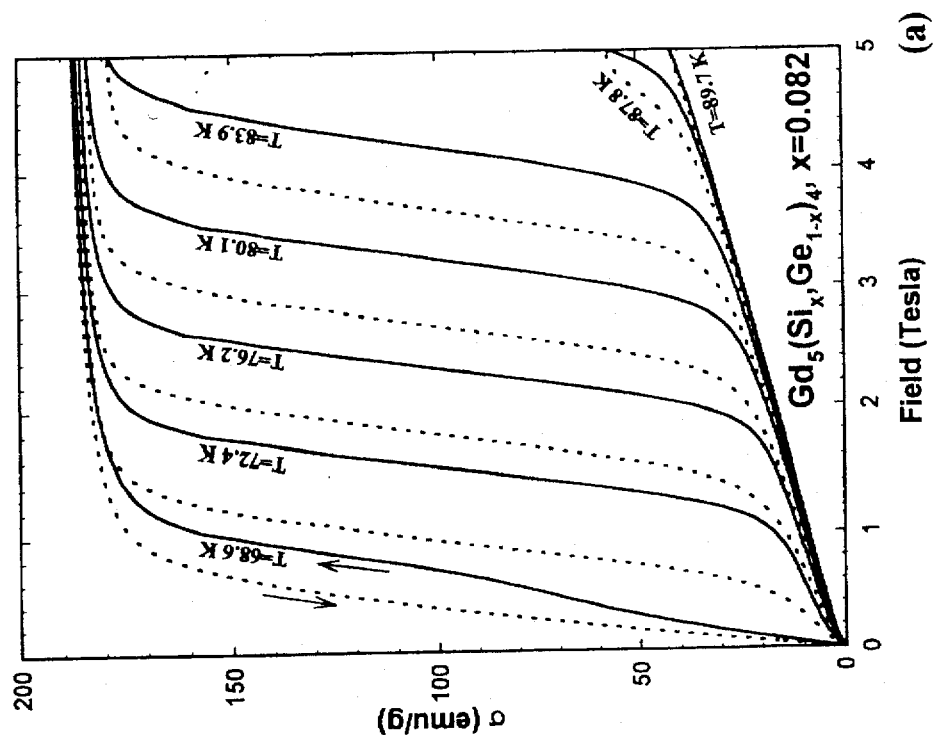
FIG. 2A is a graph of magnetic field versus magnetization isotherms near the Curie temperature for the $Gd_5(Si_xGe_{1-x})_4$ where x=0.082 in a magnetic field up to 5 Tesla measured on field increase (solid lines) and field reduction (dotted lines) as marked by arrows, showing the reversible field induced spin flip transition and hysteresis.

The results of measurements of the magnetic field induced magnetic entropy change for $Gd_5(Si_xGe_{1-x})_4$ where x=0.082, 0.25 and 0.50 are shown in FIGS. 2A,B; 3A,B; and 4A,B. It is apparent that the magnetization of the samples changes drastically with temperature and magnetic field (FIGS. 2A, 3A and 4A). Since the entropy change is given as: $dS_{mag}$= integral of $dM/dT \times dH$ between $H_1$ and $H_2$, the resulting isothermal magnetic entropy change $dS_{mag}$ is quite large.

Figure 3B:
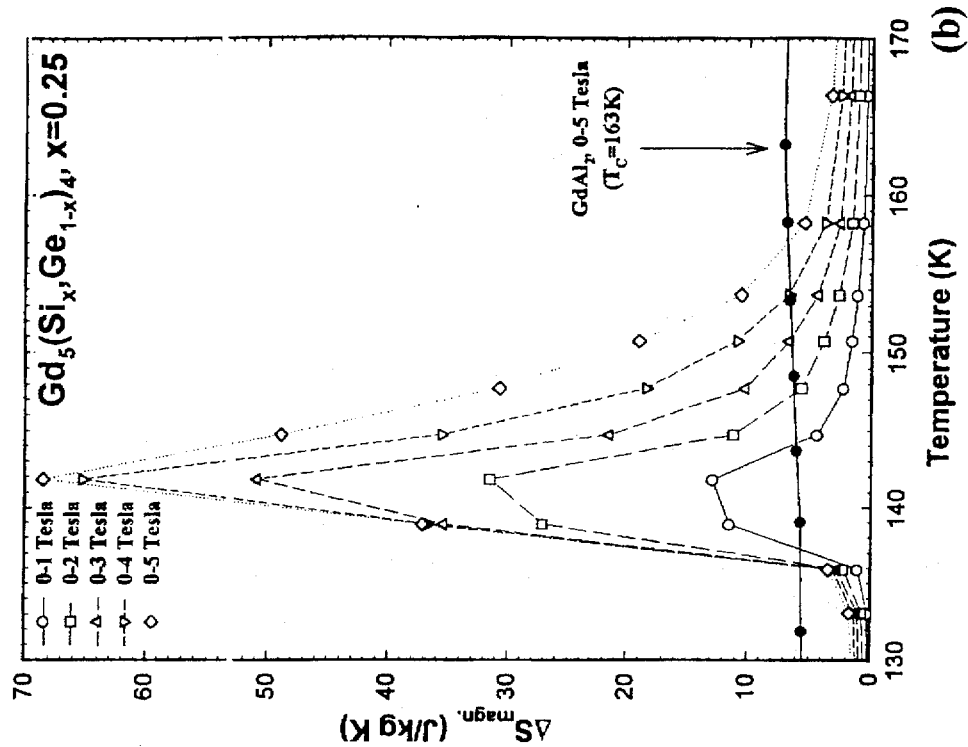
FIG. 3B is a graph of the corresponding temperature versus isothermal magnetic entropy change for a magnetic field change from 0 to 1, 0 to 2, 0 to 3, 0 to 4, and 0 to 5 Tesla.
Figure 3A:
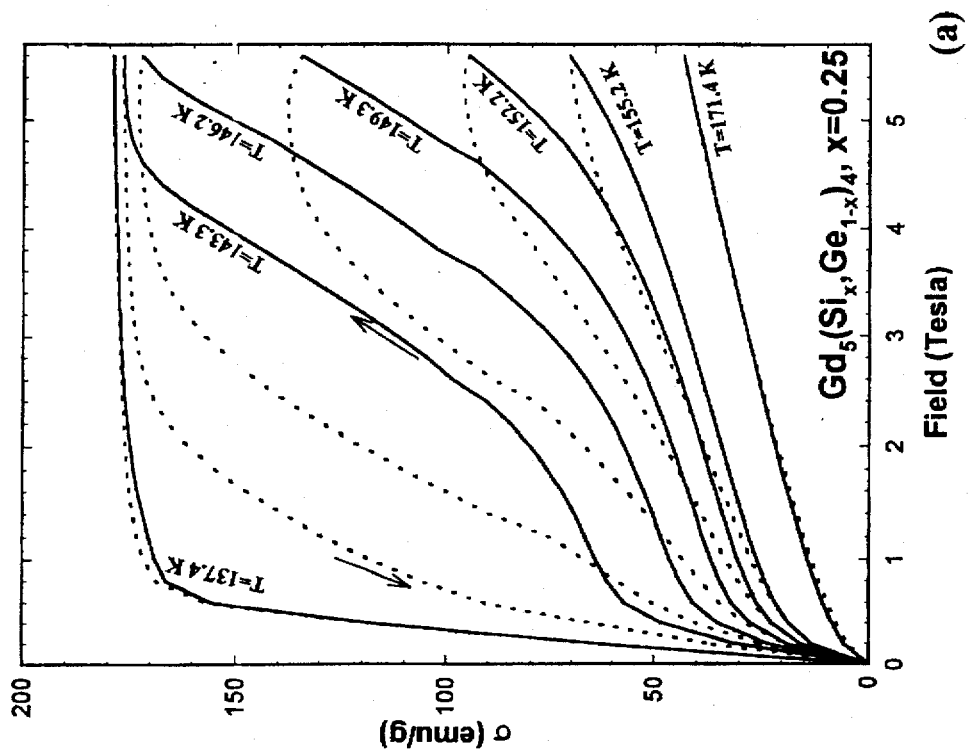
FIG. 3A is a graph of magnetic field versus magnetization isotherms near the Curie temperature for the $Gd_5(Si_xGe_{1-x})_4$ where x=0.25 in a magnetic field up to 5.6 Tesla measured on field increase (solid lines) and field reduction (dotted lines) as marked by arrows, showing the reversible field induced spin flip transition and hysteresis.
Figure 4B:
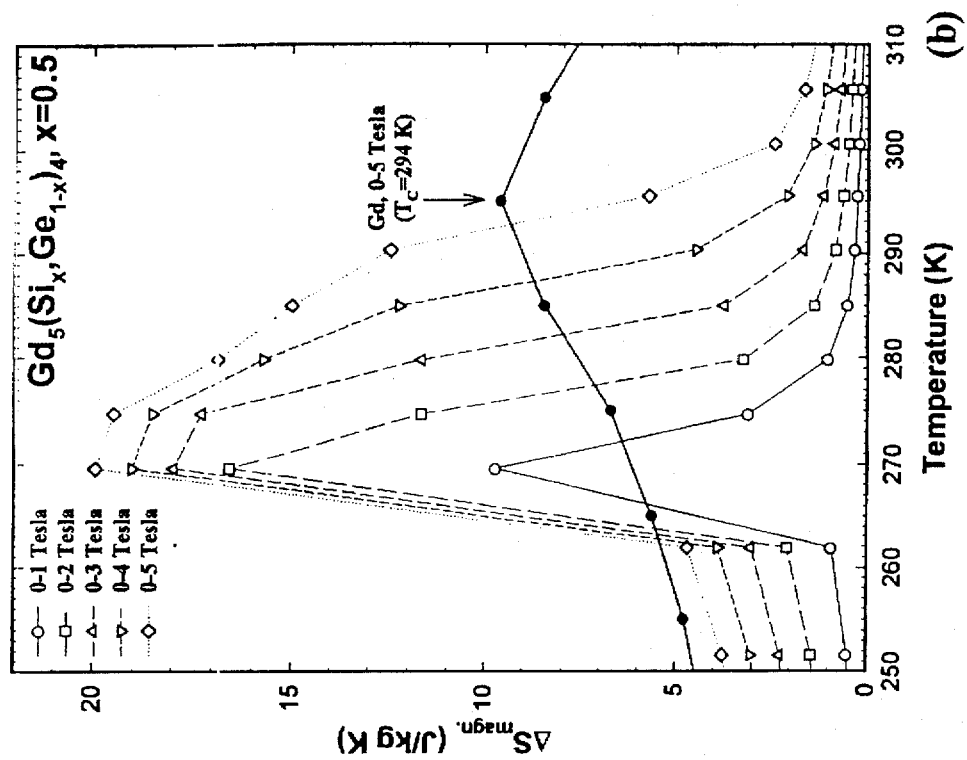
FIG. 4B is a graph of the corresponding temperature versus isothermal magnetic entropy change for a magnetic field change from 0 to 1, 0 to 2, 0 to 3, 0 to 4, and 0 to 5 Tesla.
Figure 4A:
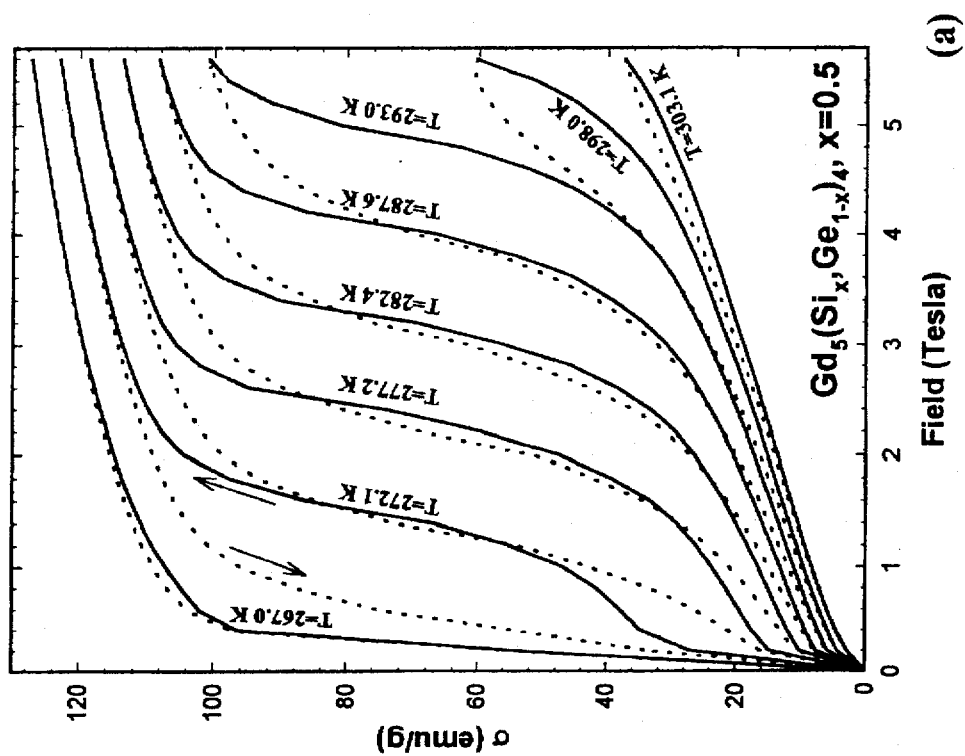
FIG. 4A is a graph of magnetic field versus magnetization isotherms near the Curie temperature for the $Gd_5(Si_xGe_{1-x})_4$ where x=0.5 in a magnetic field up to 5.6 Tesla measured on field increase (solid lines) and field reduction (dotted lines) as marked by arrows, showing the reversible field induced spin flip transition and hysteresis.

FIGS. 2B, 3B, and 4B illustrate results of the calculations of $dS_{mag}$ from the magnetization data presented in FIGS. 2A, 3A and 4A for $Gd_5(Si_xGe_{1-x})_4$ where x=0.082, 0.25 and 0.50 and for comparison ferromagnetic refrigerants which are the best prototypes for use as active magnetic regenerators for approximately the same range of temperatures. It is apparent that $Gd_5(Si_{0.082}Ge_{0.918})_4$, FIG. 2B, is more than 200% better than $DyAl_2$ prototype; that $Gd_5(Si_{0.25}Ge_{0.75})_4$, FIG. 3B, is almost 1000% better than $GdAl_2$ prototype; and that $Gd_5(Si_{0.5}Ge_{0.5})_4$, FIG. 4B, is almost 200% better than Gd metal prototype for a magnetic field change from 0 to 5 Tesla. Approximately the same relations between performance of the refrigerants were found for lower and higher magnetic fields.

The extraordinarily high magnetocaloric effect for the $Gd_5(Si_xGe_{1-x})_4$ refrigerants where x is less than 0.5 and higher than 0 is apparent from FIG. 5 where the magnetization isotherms of Gd are shown together with those for $Gd_5(Si_{0.5}Ge_{0.5})_4$. In particular, the magnetization of both $Gd_5(Si_{0.5}Ge_{0.5})_4$ and Gd are similar at temperatures below the magnetic phase transition (upper curves). However, when the temperature exceeds the Curie temperature, the magnetization in the $Gd_5(Si_{0.5}Ge_{0.5})_4$ is reduced roughly twice as much as that of Gd (lower curves). This difference is attributed to the $Gd_5(Si_{0.5}Ge_{0.5})_4$ having a different (ferromagnet-I) magnetic structure above the lower Curie temperature while Gd becomes paramagnetic. The ferromagnetic-II to ferromagnetic-I transformation leads to a much stronger reduction of the magnetization than in the case of a ferromagnetic to paramagnetic transformation mainly because, in the latter case, short range ferromagnetic order persists to temperatures well above the actual Curie temperature. This effect gives a significant contribution to the enhanced magnetization, particularly in the presence of magnetic fields for Gd.

The area between the magnetization isotherms of FIG. 5 graphically represents the result of the calculation of the integral for magnetic entropy set forth above when the magnetic field changes from 0 to 5 Tesla and temperature changes from 267 K to 298 K for $Gd_5(Si_{0.5}Ge_{0.5})_4$ and Gd. It is apparent that the area defined by the two magnetization curves for $Gd_5(Si_{0.5}Ge_{0.5})_4$ is approximately twice as large as the area between the two isotherms for Gd. Hence, $Gd_5(Si_{0.5}Ge_{0.5})_4$ exhibits an extraordinarily higher (200%) magnetocaloric effect as compared to that of Gd.

FIGS. 6A, 7A and 8A present the results of measurement of the heat capacity of $Gd_5(Si_xGe_{1-x})_4$ where x=0.0825, 0.43, and 0.8, and are respectively representative of alloys in the three different crystallographic phase regions shown in FIG. 1. It is apparent that heat capacity maximum due to the first order phase transition is shifted towards higher temperatures in all cases by as much as 40–45 K from its initial temperature at zero magnetic field (FIGS. 6A and 7A). The magnetic heat capacity measurements in the case of $Gd_5(Si_xGe_{1-x})_4$ where x is greater than 0 and equal to or less than 0.5 do not yield meaningful values for $dS_{mag}$ as well as the magnetocaloric effect as a result of latent heat of transformation near the temperature of the first order phase transformation. The magnitude of the latent heat of transformation near the temperature of the first order phase transformation is unknown and makes impossible an accurate measurement of the heat capacity near the first order transformation using the heat-pulse calorimeter technique described above.

As a result, the magnetocaloric effect ($dT_{ad}$) in the case of $Gd_5(Si_xGe_{1-x})_4$ where x greater than 0 and equal to or less than 0.5 can be estimated by calculations using the total entropy calculated from the zero magnetic field heat capacity data and the accurate $dS_{mag}$ from the measured magnetization data.

FIGS. 6B, 7B and 8B present total entropy as a function of temperature for $Gd_5(Si_xGe_{1-x})_4$ where x=0.0825, 0.43, and 0.8. It is evident, that the total entropy curve behavior with temperature is qualitatively different for the three distinct phase regions in the $Gd_5(Si_xGe_{1-x})_4$ system. The $Gd_5Ge_4$-based solid solution (FIG. 6B) shows a sharp step-like increase in the total entropy in zero magnetic field, as well as in magnetic fields of 2, 5, 7.5 and 10 Tesla. The step-like increase in total entropy is being shifted towards higher temperature when the magnetic field increases and this causes the $dT_{ad}$ maximum (FIG. 6C) to become wider with increasing magnetic field. The alloys within the monoclinic region also show similar step-like increase in the behavior of the total entropy (FIG. 7B) which, however, is not as sharp. The effect of the magnetic field shifts this entropy anomaly towards higher temperatures and simultaneously makes it less pronounced. This difference leads to slightly different behavior of the magnetocaloric effect (FIG. 7C) characterized by a broader $dT_{ad}$ vs. T dependence than is seen in FIG. 6C. In both cases (FIGS. 6B and 7B), the total entropy vs. temperature behavior conforms with thermodynamic theory for the first order phase transitions. The total entropy behavior for the orthohombic $Gd_5Si_4$-based solid solution region in the $Gd_5(Si_xGe_{1-x})_4$ system is typical for a second order phase transition, with an obvious slope change, as shown in FIG. 8B. The effect of magnetic field on the total entropy behavior is in leveling-off of this slope change, resulting in much wider $dT_{ad}$ vs. T dependence as shown in FIG. 8C, i.e. the typical "caret-like" behavior seen for most ferromagnetic materials.

The adiabatic temperature rise for all of the alloys examined are summarized in FIG. 9 for x=0, 0.0375, 0.0825, 0.25, 0.43, 0.5, 0.515, 0.5325, 0.8 and 1.0. As shown in this figure, the magnetocaloric effect behavior is covered for the entire range of temperatures from about 10 K to about 350 K by changing the relative ratio of Si to Ge from 0 to 1.0 in the $Gd_5(Si_xGe_{1-x})_4$ alloys. With respect to temperatures of about 100 K and temperatures between 160 and 210 K, an alloy with x equal to about 0.15 should be an excellent active magnetic regenerator material for operation at about 110 K, while two alloys with x equal to about 0.31 and about 0.37 will provide excellent adiabatic temperature rises and magnetic entropy changes to serve as magnetic refrigerants in the 160 K to 185 K, and 185 K to 210 K ranges.

FIGS. 6D, 7D and 8D present the magnetic entropy change calculated from FIGS. 6B, 7B and 8B as a function of temperature for $Gd_5(Si_xGe_{1-x})_4$ where x=0.0825, 0.43 and 0.8. Also, these heat capacity results are compared to the values obtained from magnetization measurements. The magnetization entropies are always significantly larger than the heat capacity results (FIGS. 6D and 7D) for the alloys where there is a first order ferromagnetic to antiferromagnetic or ferromagnetic-I to ferromagnetic-II phase transition, respectively. As discussed above, this is due to the inability of heat capacity measurements to measure the heat of transformation of a first order transition. For the x=0.8, the magnetic entropy changes obtained from the two methods are in agreement within experimental error (FIG. 8D), because in this case there is a ferromagnetic to paramagnetic second order transformation, and the heat capacity technique yields the correct values.

FIGS. 6E and 7E present the reciprocal magnetic susceptibility as a function of temperature for $Gd_5(Si_xGe_{1-x})_4$ where x=0.0825 and 0.43. These data show the ferromagnetic (ferromagnet-II) to antiferromagnetic (ferromagnetic-I) and antiferromagnetic (ferromagnetic-I) to paramagnetic transformations, respectively. In the paramagnetic region (above about 250 K and about 300 K, respectively) the gadolinium ions have their full magnetic moment (i.e. $p_{ef}$ as measured is about equal to the theoretical value of $p_{ef}$=7.94 $\mu_B$).

The results of these magnetocaloric effect calculations for $Gd_5(Si_xGe_{1-x})_4$ samples is summarized in FIG. 10, where the regenerator efficiency is compared for these alloys with prototype materials for various temperature ranges. In the 10 K to 50 K range, the alloy with x equal to 0 is 66% more efficient than $DyNi_2$; in the 60 K to 90 K range, the alloy with x equal to 0.0825 is 60% more efficient than $DyAl_2$; in the 130 K to 185 K range, the alloy with x equal to 0.25 is 116% more efficient than $GdAl_2$; in the 230 K to 280 K range, the alloy with x equal to 0.43 is 69% more efficient than the $Gd_{0.85}Er_{0.15}$ alloy; in the 260 K to 305 K range, the alloy with x equal to 0.5 is 56% more efficient than Gd; and in the 270 K to 315 K range, the alloy with x equal to 0.5 and with a 3 atomic % substitution of gallium for the total Si+Ge content is 27% more efficient than Gd. These results show that the active magnetic regenerator $Gd_5(Si_xGe_{1-x})_4$ samples are far superior compared to the known prototype magnetic refrigerants; in particular, they display an adiabatic temperature rise of 2 K/Tesla or higher, see FIG. 5, and simultaneously will reject 27% to 116% more heat than the best known prototype active magnetic regenerators.

The MCE in terms of $dT_{ad}$ for all $Gd_5(Si_xGe_{1-x})_4$ refrigerants with x equal to or less than 0.5 is shown in FIG. 9 as determined from heat capacity measurements for a magnetic field change from 0 to 7.5 Tesla. The $dT_{ad}$ appears to look low when compared with the giant $dS_{mag}$, FIGS. 2B, 3B, 4B, 6D and 7D, but this is understood when it is recalled that $dT_{ad}$ is inversely proportional to $C_H$ and that $C_H$ reaches extremely high values in the vicinity of the magnetic phase transition. The $dT_{ad}$ figures are most likely underestimated by approximately 20–30% but even so, the adiabatic temperature rise in a magnetic field of 7.5 Tesla for any given $Gd_5(Si_xGe_{1-x})_4$ refrigerant equals or exceeds that of the best known magnetocaloric prototype refrigerants discussed above.

The lower temperature magnetic ordering in $Gd_5(Si_xGe_{1-x})_4$ refrigerants with x equal to less than about 0.5 is a thermodynamically reversible first order phase transition. This is evident from both magnetization (typical behavior is shown in FIG. 2A for $Gd_5(Si_xGe_{1-x})_4$ with x equal to 0.0825 and heat capacity measurements (a typical behavior is shown in FIG. 6A for the same composition). Even though the transition is partially hysteretic, which is a specific feature of any first order phase transition, the magnetic structure changes back to antiferromagnetic (or ferromagnetic-I), and the remanent magnetization for all samples is zero (0) when the magnetic field is removed (FIG. 2A). The observed magnetocaloric effect, expressed in terms of the magnetic entropy change ($dS_{mag}$) achieves the largest value ever reported in the literature for any magnetic solid. The $dS_{mag}$ is as much as 2 to 2.5 times larger than that of the best known magnetic refrigerant, Gd.

The Curie temperature dependence on the Si concentration in $Gd_5(Si_xGe_{1-x})_4$ samples is shown in FIG. 1 and serves as the fundamental basis for the proper selection of a particular $Gd_5(Si_xGe_{1-x})_4$ refrigerant to produce effective cooling in the desired range of temperatures as illustrated in the following examples.

EXAMPLE 1

To design the active magnetic regenerator for a magnetic refrigerator or air-conditioner operating in a magnetic field of 5 Tesla or above with the heat exhausted into cold water (hot end temperature equals or is lower that 18 degrees C., or 291 K), the $Gd_5(Si_{0.5}Ge_{0.5})_4$ refrigerant would be used alone and will produce an effective cooling from 18 degrees C. to the freezing temperature of water, FIG. 9.

EXAMPLE 2

To design the active magnetic regenerator for a magnetic refrigerator or air-conditioner operating in a magnetic field of 5 Tesla or above with the heat exhausted into the normal ambient environment; atmospheric air, (hot end temperature higher than 18 degrees C. or 291 K), the $Gd_5(Si_{0.5}Ge_{0.5})_4$ refrigerant would be used for a lower stage regenerator and the $Gd_5(Si_{0.485}Ge_{0.485}Ga_{0.03})_4$ refrigerant for the upper stage regenerator. The two refrigerants together will produce an effective cooling from 30–40 degrees C. (303–313 K) to the freezing temperature of water, FIGS. 9 and 10.

EXAMPLE 3

To design the active magnetic regenerator for a magnetic air-conditioner operating in a magnetic field of 1.5 Tesla or below with the heat exhausted into the normal ambient environment; atmospheric air, (hot end temperature higher than 18 degrees C., or 291 K), the $Gd_5(Si_{0.5}Ge_{0.5})_4$ refrigerant would be used for a lower stage regenerator and $Gd_5(Si_{0.485}Ge_{0.485}Ga_{0.03})_4$ refrigerant for the upper stage regenerator. The two refrigerants together will produce an effective cooling from 30–40 degrees C. (303–313 K) to the freezing temperature of water, FIG. 10.

EXAMPLE 4

To design the active magnetic regenerator for a magnetic refrigerator operating in a magnetic field of 5 Tesla or above with the heat exhausted into liquid nitrogen (hot end temperature equals 77 K) and capable of effective cooling to approximately 35 to 40 K, the $Gd_5(Si_{0.03}Ge_{0.07})_4$ refrigerant would be used for a lower stage regenerator and $Gd_5(Si_{0.08}Ge_{0.02})_4$ refrigerant for the upper stage regenerator. The two refrigerants together will produce an effective cooling from 77 K to approximately 40 K, FIG. 9.

EXAMPLE 5

To design the active magnetic regenerator for the liquefaction of natural gas (boiling point 109 K) operating in a magnetic field of 5 Tesla or above with the heat exhausted into the normal ambient environment; atmospheric air, (hot end temperature higher than 18 degrees C., or 291 K), seven temperature stages would use the $Gd_5(Si_xGe_{1-x})_4$ refrigerant where x=0.17, 0.24, 0.30, 0.36, 0.42, and 0.50 for increasing temperature stages, and $Gd_5(Si_{0.485}Ge_{0.485}Ga_{0.03})_4$ refrigerant for the final upper stage regenerator. This combination of refrigerants will produce an effective cooling from 30–40 degrees C. (303–313 K) to slightly below the boiling point of natural gas (109 K).

EXAMPLE 6a

To design the active magnetic regenerator for the liquefaction of hydrogen gas (boiling point 20.3 K) operating in a magnetic field of 5 Tesla or above with the heat exhausted into the normal ambient environment; atmospheric air, (hot end temperature higher than 18 degrees C., or 291 K), ten temperature stages would use the $Gd_5(Si_xGe_{1-x})_4$ refrigerant where x=0, 0.05, 0.10, 0.17, 0.24, 0.30, 0.36, 0.42, and 0.50 for increasing temperature stages, and the $Gd_5(Si_{0.485}Ge_{0.485}Ga_{0.03})_4$ refrigerant for the final upper stage regenerator. This combination of refrigerants will produce an effective cooling from 30–40 degrees C. (303–313 K) to slightly below the boiling point of hydrogen gas (20 K).

EXAMPLE 6b

To design the active magnetic regenerator for the liquefaction of hydrogen gas (boiling point 20.3 K) operating in a magnetic field of 5 Tesla or above with the heat exhausted into liquid nitrogen (hot end temperature equals 77 K), three temperature stages would use the $Gd_5(Si_xGe_{1-x})_4$ refrigerant where x=0 and 0.0375 for increasing temperature stages, and the x=0.0825 refrigerant for the final upper stage regenerator. In this liquefier the liquid nitrogen is used to precool the hydrogen gas to 77 K before it is further cooled to about 20 K (to liquefy the hydrogen) by the magnetic refrigerator. This combination of refrigerants (the liquid nitrogen plus the three magnetic regenerator stages) will produce an effective cooling from 30–40 degrees C. (303–313 K) to slightly below the boiling point of hydrogen gas (20 K).

FIG. 10 presents comparison of regenerator efficiency (i.e figure of merit) which is given as the integral of $dS_{mag}dT$ from $T_1$ to $T_2$ for the series of $Gd_5(Si_xGe_{1-x})_4$ refrigerants together with that for the Gd metal prototype refrigerant. Again, it is apparent that the refrigerants of the invention are significantly more efficient because they have a much larger cooling capacity and will reject approximately twice the amount of heat compared to the Gd refrigerant. This is analogous to the difference between CFC-HCFC based air conditioner and gas compressive/expansion-based units wherein the former is much more efficient due to the much larger cooling capacity of the evaporating liquid as compared to a simple adiabatic temperature reduction of the expanding gas.

Another important parameter for any refrigerant is its cooling (or heating) capacity: q=integral of $dS_{mag}dT$ from $T_1$ to $T_2$; i.e. the amount of heat which is exhausted (generated) by a given magnetic field change over a working region of temperatures from $T_1$ to $T_2$. The higher the q value, the better the refrigerant since it can transfer more heat during one cycle. Again, the $Gd_5(Si_xGe_{1-x})_4$ refrigerants show almost a two-fold improvement in q value compared to previously known refrigerant prototypes. For example, a q value of 567 J/kg for $Gd_5(Si_{0.5}Ge_{0.5})_4$ over the temperature range 260 to 305 K is about 57% larger than that, q=363 J/kg, of Gd for the same temperature range.

Any refrigerator, including active magnetic refrigerators, work in a cyclic manner with heat generated (vented) on one side and the cooling effect generated on the other side of the refrigerator. Thus, the refrigerator itself can be easily transformed into a heat pump (i.e. into a heater by using the generated heat as a useful load and venting the generated cold air). Usually the heat from a gas compression air conditioner is more expensive than the heat vented by a gasoline or diesel engine. However, for an electric vehicle such a heat source (combustion engine) is not available, and electrical energy from the batteries would be used to heat the vehicle. In lieu of energy from the batteries, an active magnetic refrigerator could be used with the magnetic entropy being usable for both cooling in summer and heating in winter. The same principle also applies to home air conditioners for cooling and heating. The active magnetic regenerator and method of the present invention thus can function as a refrigerator, air conditioner, and heat pump with significantly improved efficiency and operating temperature range from approximately 30 K to 290 K and above. Use in vehicles, such as automobiles, and buildings is contemplated.

It will be understood that the above description of the invention is susceptible to various modifications, changes, and adaptations, and the same are intended to be comprehended within the scope of the appended claims.

We claim:

1. A magnetic refrigerant for a magnetic regenerator consisting essentially of about 53 to about 58 atomic % Gd, up to about 47 atomic % Ge, and up to about 47 atomic % Si exhibiting a reversible ferromagnetic to antiferromagnetic or ferromagnetic-II to ferromagnetic-I first order phase transition with changing temperature and magnetic field that provides a magnetic entropy change that is at least twice that exhibited by polycrystalline Gd.

2. The refrigerant of claim 1 further comprising an alloying element selected from the group consisting of Be, Mg, Ca, Zn, Cd, B, Al, Ga, In, Tl, C, Sn, Pb, N, P, As, Sb, Bi, Se, Te, Ti, Zr, Hf, V, Nb, Ta, Cr, Mo, W, Mn, Fe, Co, Ni and Cu.

3. The refrigerant of claim 2 wherein Ga is present up to about 10 atomic %.

4. A magnetic refrigerant for a magnetic regenerator consisting essentially of about 53 to about 58 atomic % Gd, about 6 to about 25 atomic % Si, and about 20 to about 38 atomic % Ge having a monoclinic crystal structure and a reversible ferromagnetic-II to ferromagnetic-I first order phase transition with changing temperature and magnetic field.

5. A magnetic refrigerant for a magnetic regenerator consisting essentially of $Gd_5(Si_xGe_{1-x})$ where x is equal to or less than about 0.55 and exhibiting a reversible ferromagnetic to antiferromagnetic or ferrromagnetic-II to ferromagnetic-I first order phase transition with changing temperature and magnetic field that provides a magnetic entropy change that is at least twice that exhibited by polycrystalline Gd.

6. The refrigerant of claim 4 further comprising an alloying element selected from the group consisting of Be, Mg, Ca, Zn, Cd, B, Al, Ga, In, Tl, C, Sn, Pb, N, P, As, Sb, Bi, Se, Te, Ti, Zr, Hf, V, Nb, Ta, Cr, Mo, W, Mn, Fe, Co, Ni and Cu.

7. The refrigerant of claim 6 wherein Ga is present up to about 10 atomic %.

8. A magnetic refrigerant for a magnetic regenerator consisting essentially of $Gd_5(Si_xGe_{1-x})_4$ where x is about 0.2 to about 0.5 having a monoclinic crystal structure and exhibiting a reversible ferromagnetic-II to ferromagnetic-I first order phase transition with changing temperature and magnetic field.

9. The refrigerant of claim 8 further comprising an alloying element selected from the group consisting of Be, Mg, Ca, Zn, Cd, B, Al, Ga, In, Tl, C, Sn, Pb, N, P, As, Sb, Bi, Se, Te, Ti, Zr, Hf, V, Nb, Ta, Cr, Mo, W, Mn, Fe, Co, Ni and Cu.

10. The refrigerant of claim 9 wherein Ga is present up to about 10 atomic %.

11. A magnetic regenerator having means for providing a magnetic field and a working medium subjected to said magnetic field and consisting essentially of about 53 to about 58 atomic % Gd, up to about 47 atomic % Si, and up to about 47 atomic % Ge exhibiting a reversible ferromagnetic to antiferromagnetic or ferrromagnetic-II to ferromagnetic-I first order phase transition with changing temperature and magnetic field.

12. The regenerator of claim 11 further comprising an alloying element selected from the group consisting of Be, Mg, Ca, Zn, Cd, B, Al, Ga, In, Tl, C, Sn, Pb, N, P, As, Sb, Bi, Se, Te, Ti, Zr, Hf, V, Nb, Ta, Cr, Mo, W, Mn, Fe, Co, Ni and Cu.

13. The regenerator of claim 12 wherein Ga is present up to about 10 atomic %.

14. The regenerator of claim 11 wherein said means for providing said magnetic field provides an alternating magnetic field.

15. The regenerator of claim 11 wherein said means for providing said magnetic field comrpises a magnet for providing a permanent magnetic field, and including means for relatively moving said magnet and said working medium.

16. The regenerator of claim 11 which is a refrigerator.

17. The regenerator of claim 11 which is a heat pump.

18. The regenerator of claim 11 wherein said working medium consists essentially of about 53 to about 58 atomic % Gd, about 6 to about 25 atomic % Si, and about 20 to about 38 atomic % Ge having a monoclinic crystal structure and a reversible ferromagnetic-II to ferromagnetic-I first order phase transition with changing temperature and magnetic field.

19. The regenerator of claim 11 wherein said working medium consists essentially of $Gd_5(Si_xGe_{1-x})_4$ where x is equal to or less than about 0.55 and exhibiting a reversible ferromagnetic to antiferromagnetic or ferrromagnetic-II to ferromagnetic-I first order phase transition with changing temperature and magnetic field.

20. A method of magnetic regenerating comprising subjecting a working medium to a magnetic field wherein said working medium consists essentially of about 53 to about 58 atomic % Gd, up to about 47 atomic % Ge, and up to about 47 atomic % Si, exhibiting a reversible ferromagnetic to antiferromagnetic or ferrromagnetic-II to ferromagnetic-I first order phase transition with changing temperature and magnetic field.

21. The method of claim 20 wherein said working medium further comprises an alloying element selected from the group consisting of Be, Mg, Ca, Zn, Cd, B, Al, Ga, In, Tl, C, Sn, Pb, N, P, As, Sb, Bi, Se, Te, Ti, Zr, Hf, V, Nb, Ta, Cr, Mo, W, Mn, Fe, Co, Ni and Cu.

22. The method of claim 21 wherein Ga is present up to about 10 atomic %.

23. The method of claim 20 including providing an alternating magnetic field.

24. The method of claim 20 including providing a permanent magnetic field using a magnet and relatively moving said magnet and said working medium.

25. The method of claim 20 involving refrigerating a load.

26. The method of claim 20 involving heating a load.

27. The method of claim 20 wherein said working medium consists essentially of 53 to 58 atomic % Gd, 6 to 25 atomic % Si, and 20 to 38 atomic % Ge having a monoclinic crystal structure and a reversible ferromagnetic-II to ferromagnetic-I first order phase transition with changing temperature and magnetic field.

28. The method of claim 20 wherein said working medium consists essentially of $Gd_5(Si_xGe_{1-x})_4$ where x is equal to or less than 0.5 and exhibiting a reversible ferromagnetic to antiferromagnetic or ferromagnetic-II to ferromagnetic-I first order phase transition with changing temperature and magnetic field.

* * * * *